United States Patent [19]
Kilkki

[11] Patent Number: 6,081,505
[45] Date of Patent: *Jun. 27, 2000

[54] CELL SCHEDULING SYSTEM AND METHOD FOR NETWORKS NODES

[75] Inventor: Matti Kalevi Kilkki, Espoo, Finland

[73] Assignee: Nokia Telecommunications, OY, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/822,266

[22] Filed: Mar. 20, 1997

[51] Int. Cl.$^7$ .............................. H04L 12/56; H04L 12/54

[52] U.S. Cl. .......................... 370/230; 370/252; 370/418

[58] Field of Search ..................................... 370/229, 230, 370/231, 232–233, 234–235, 239, 252, 253, 254, 411, 412, 413, 414, 415, 416, 417, 418, 420, 428, 429, 468

[56] References Cited

U.S. PATENT DOCUMENTS

| | | | |
|---|---|---|---|
| 5,359,593 | 10/1994 | Derby et al. | |
| 5,463,620 | 10/1995 | Sriram | 370/411 |
| 5,557,608 | 9/1996 | Calvignac et al. | 370/462 |
| 5,600,641 | 2/1997 | Duault et al. | 370/400 |
| 5,790,522 | 8/1998 | Fichou et al. | 370/236 |
| 5,818,499 | 7/1996 | Unekanwa | 370/429 |
| 5,818,818 | 10/1998 | Soumiya et al. | 370/412 |
| 5,828,653 | 10/1998 | Goss | 370/230 |
| 5,838,922 | 11/1998 | Galand et al. | 370/412 |

OTHER PUBLICATIONS

Technical Committee, Traffic Management Specification Version 4.0, af–tm–00561.000, Apr. 1996, pp. 1–59.

Integrated Services Digital Network (ISDN) Overall Network Aspects and Functions, Traffic Control and Congestion Control in B–ISDN, ITU–T Recommendation 1.371, Mar. 1993, pp. 1–27.

What are the meaning of CBR, VBR, ABR, UBR?, Maintained by Carl Symborski, Last Changed Aug. 20, 1996, Pp. 1–2 and 1–5.

ATM Service Categories: The Benefits to the User, Editor: Libio Lambaarelli, CSELT' Torino, Italy, Pp. 1–10.

An Overview of ATM Technology, Gary Kessler, Jan. 1995, Pp. 1–10.

ATM—The New Technology for Tomorrow's B–ISDN, Engui Yao, Dec. 1994, Pp. 1–23.

*Primary Examiner*—Chi H. Pham
*Assistant Examiner*—Steven Nguyen
*Attorney, Agent, or Firm*—Altera Law Group, LLC

[57] ABSTRACT

A system and method for managing elements of information at a network node received from a user access node. An access node includes a user/network interface (UNI), and a core network node includes a cell filtering unit. The UNI includes a measuring unit, which measures the actual momentary bit rate of a connection between the UNI and the core node, and a priority level computing unit, which computes the priority level of each cell using the measured bit rate and an established nominal bit rate (NBR). NBR represents an expected, but not guaranteed, bit rate associated with a particular user or connection. The connection may be a real-time or a non-real-time connection. A scheduling unit of a node accepts or discards an arriving cell based on the occupancy of a real-time buffer and a non-real-time buffer provided at the node. Cells accepted by the scheduling unit are transferred to either the real-time buffer or the non-real-time buffer depending on cell type, and read out of the buffers with preference given to cells in the real-time buffer. A UNI may include two measuring units for measuring a short-term and a long-term bit rate of the connection, respectively. Packets of cells may be processed by the scheduling unit, such that if the first cell of the packet is discarded by the node, then all subsequent cells of the packet are discarded. If the first cell of a packet is accepted, then the priority of other cells of the packet may be increased.

12 Claims, 17 Drawing Sheets

CELL SCHEDULING SYSTEM AND METHOD FOR NETWORKS NODES

FIELD OF THE INVENTION

The present invention relates generally to communications systems, and more particularly, to a system and method for managing cells of information received at a node of a network.

BACKGROUND OF THE INVENTION

The state of communications technology, particularly that which affects the Internet, is currently in flux and subject to rapid and often uncoordinated growth. The ubiquity and diversity of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

The communications industry is expending considerable attention and investment on one particular technology, referred to as asynchronous transfer mode (ATM), as a possible solution to current and anticipated infrastructure limitations. Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification reference hereinbelow include, for example, a constant bit rate (CBR) category, a real-time variable bit rate (rt-VER) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications.

Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

Some commentators have suggested that a solution to these problems may be found by increasing the bandwidth or capacity of the network (e.g., the Internet). Implementing this overly simplistic solution would require an appreciable investment of hardware, software, and, most likely, replacing existing communication lines with high bandwidth transmission lines, such as fiber optic lines. This suggested solution, however, would likely result in undisciplined network expansion and uncoordinated management of network traffic. Also, such a solution, if implemented, would appear to obviate the need for much of the sophisticated traffic management features currently defined in ATM specifications.

Another possible solution involves the implementation of cheaper, faster, and higher capacity network nodes. Although the cost of electronic components continues to generally decline, the complexity of current and proposed ATM service specifications continues to increase. In order to satisfy the traffic management requirements of the above-described ATM services, for example, sophisticated software and hardware is typically integrated into a network node. This increase in the complexity of node design and manufacture results in a corresponding increase in the cost of such network nodes.

Accordingly, there is a need in the communications industry for a network management architecture and method that is simple in concept and in its implementation, yet adequately addresses the quality of service requirements to support a range of network services, including real-time and non-real-time services. There exists a further need for a system and methodology that provides for the implementation of low cost, high throughput network nodes that accommodate both real-time and non-real-time connections. The present invention fulfills these and other needs which remain unaddressed by prior art network traffic management approaches.

SUMMARY OF THE INVENTION

The present invention is directed to a system and method for managing elements of information at a network node received from a user access node. The network includes access nodes which provide user access to core nodes of the network. At an access node, the traffic of all connections associated with the access node is measured. A nominal bit rate (NBR), which is established by the user or the system for the access node, is used together with the traffic measurement at the access node to compute a priority level. The value of NBR represents an expected, but not guaranteed, bit rate associated with a particular user or connection. The connection may be a real-time or a non-real-time connection. Information elements transmitted from the access node to a core network node are each assigned one of several priority levels, such as one of eight priority levels. Information elements received at the core node are either accepted or discarded based on the priority level of the information elements and the status of one or more buffers at the core node.

In accordance with one embodiment of the present invention, an access node includes a user/network interface, and a core network node includes a cell filtering unit. The UNI includes a measuring unit which measures the actual momentary bit rate of a connection between the UNI and the core node. The UNI also includes a priority level computing unit that computes the priority level of each cell using the measured bit rate and the established NER. A scheduling unit of a node accepts or discards an arriving cell based on the occupancy of a real-time buffer and a non-real-time buffer provided at the node. Cells accepted by the scheduling unit are transferred to either the real-time buffer or the non-real-time buffer depending on cell type.

In an alternative embodiment, packets of cells are processed by the scheduling unit. If the first cell of the packet is discarded by the node, then all of the cells of the packet following the first cell are discarded as well. If, however, the first cell of a packet is accepted, then the priority of all other cells belonging to that packet may be increased.

In general, cells are transferred out of the real-time buffer in preference to cells in the non-real-time buffer. In an alternative embodiment, a UNI may include two bit rate measuring units for measuring a short-term and a long-term bit rate of the connection.

The priority level computing unit then computes cell priority values using the NBR and the short-term and long-term actual bit rates.

DETAILED DESCRIPTION OF THE VARIOUS EMBODIMENTS

Figure 1:
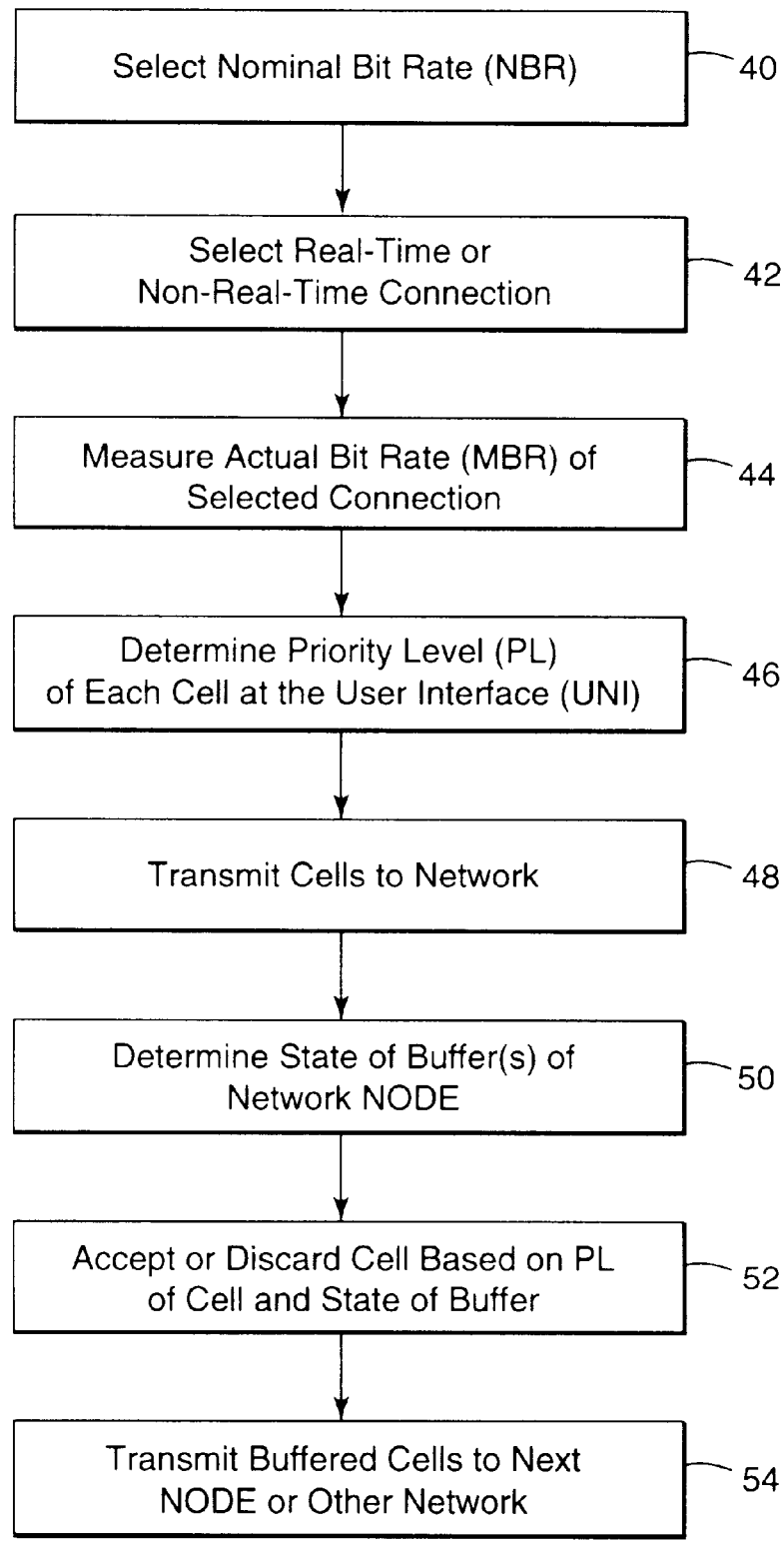
FIG. 1 is a flow diagram illustrating a general procedure for communicating cells of information between a user/network interface and a network using a nominal bit rate service in accordance with an embodiment of the present invention.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to an improved system and method for managing the communication of information over a network. An embodiment of the present invention exploits many of the advantageous aspects of ATM technology while obviating many of the disadvantages associated with conventional ATM traffic control approaches. A network or group of networks, such as the Internet, may be implemented using the principles of the present invention so as to significantly reduce the complexity and cost of network nodes and, in general, the traffic management scheme required to effectively manage the flow of information through the network. A network implemented in accordance with the principles of the present invention provides network operators the capability to offer simple and understandable services to network users, including real-time and non-real-time services.

A significant advantage realized when implementing a networking scheme in accordance with the principles of the present invention concerns a substantial reduction in the cost and complexity of network node design and implementation. Many advantages offered by ATM technology, such as the provision of very fast and large inexpensive switches, and the potential of ensuring short delays for interactive connections, may be realized by adopting the new network service paradigm of the present invention which exploits the structure of the ATM cell divorced from the complex traffic management requirements imposed by current ATM specifications.

The service concept described herein may be viewed as a Simple Integrated Media Access (SIMA) service model. The SIMA service model incorporates the basic properties of ATM with the addition of eight priority levels as defined within the context of a new service concept termed a nominal bit rate (NBR) service. In general, the NBR service provides for the simple and efficient division of network capacity amongst different connections and the charging of user fees for the use of such connections. A network that embraces a basic version of the SIMA service model does not need to perform many of the traditional and burdensome traffic management functions involving Traffic Descriptors, QoS parameters, Service Classes, Connection Admission Control (CAC), or Usage Parameter Control (UPC). All of these functions are effectively replaced by functions performed by two autonomous units: a measuring unit, provided at a user/network interface, and a cell scheduling and buffering unit, provided at a network node. The SIMA service concept, from a user's perspective, is simple and understandable, because there are no pre-defined traffic or quality parameters associated with each connection, and charging for connection usage is based solely on the value of NBR and the duration of the connection.

A typical implementation of a SIMA service utilizes two primary components: access nodes and core network nodes, which have fundamentally different functional responsibilities. For example, access nodes, which may be a user/network interface, perform the task of measuring traffic for every connection, whereas at the core network nodes, the traffic control functions do not need to know anything about the properties of individual connections.

The elegant simplicity of the SIMA service model offers obvious advantages to the manufacturers of infrastructure hardware and software. For example, ATM switches or crossconnects can be built using individual cell scheduling and buffering units, switching fabrics, and routing functions. By using ATM virtual paths or IP switching technology, the routing tasks may be reduced in complexity. In addition, packet discarding and priority feedback features may be included in the cell scheduling and buffering units without negatively impacting their automaticity. Also, simple implementation of network nodes may result in the availability of a relatively inexpensive, high capacity network infrastructure.

The more complex unit of the SIMA service infrastructure concerns the access nodes. Such access nodes will typically include a measuring unit to measure the traffic stream of every connection in real-time, and a computation unit for determining a priority to be assigned to every cell. These additional features should be implementable at a level of difficulty no greater than that for effecting UPC in conventional ATM networks.

A network traffic management methodology, in accordance with one embodiment of the present invention, involves allocating connection bandwidth amongst multiple users on the basis of a nominal bit rate established for each user or connection. The value of NBR, typically measured in bits per second (bits/sec), represents an expected bit rate associated with a particular user or connection that may, in actuality, vary from the established value. An NBR attributed to a particular user or connection may be constant or, alternatively, varied over the existence of a connection. Moreover, the realized or actual bit rate for a given connection may exceed the established NBR value.

Establishing an NBR for each user or connection provides a basis for determining expected bandwidth utilization and the division of network capacity amongst a multiplicity of connections, especially during overload situations. In general terms, the division of network capacity is determined using a prioritization scheme by which each cell of information communicated through the network is assigned a priority level. The process of determining the priority level of a cell is performed at the user/network interface (UNI) using the value of NBR and an actual or measured bit rate (MBR). In accordance with one embodiment of the present invention, each cell is assigned one of eight priority levels that range between zero, which indicates highest priority or importance, and seven, which indicates lowest priority or criticality.

A properly dimensioned network founded on the NBR concept of the present invention differs from conventional network paradigms in the respect that the network operator of an NBR service does not precisely guarantee a specified bit rate or a specified quality of service for a particular connection. Those skilled in the art understand that conventional network traffic management schemes which guarantee a specified connection bit rate and service quality in accordance with current ATM specifications are inherently complex. The skilled artisan, after considering the novel NBR concepts disclosed herein, will readily appreciate that significantly less complex, yet reliable, networks can be constructed which offer both real-time and non-real-time services. Interoperability between traditional ATM connections and NBR service connections, however, may be provided through use of the disclosed prioritization scheme, such as by use of a priority zero designation for the communication of cells over a traditional ATM connection, as will be discussed later in greater detail.

Cell processing at a network node is substantially simplified over conventional approaches. For example, cell acceptance and discarding, in accordance with one embodiment, is dependent on no greater than three criteria: the priority level of the cell; the service class of the cell (real-time or non-real time); and the state of the node buffer or buffers. Further, both real-time and non-real-time connections may be serviced by a single cell scheduling and buffering unit provided within a network switch.

Referring now to FIG. 1, there is shown a general methodology for transmitting information between a user/network interface and a network over an NBR service connection. Initially, a user negotiates or selects 40 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load status prior to establishing or releasing an NBR connection, although this task may not be necessary in a properly dimensioned network supporting an NBR service.

Depending on a particular application, the user selects 42 a real-time or a non-real-time network connection. The process of determining the priority level (PL) of each cell, which indicates the importance or criticality of the cell relative to other cells, involves measuring 44 the actual or measured bit rate, MBR, of the selected real-time or non-real-time connection at the UNI. The priority level of each cell is determined 46 at the UNI using a ratio of the measured bit rate, MBR, and the nominal bit rate, NBR.

After computing the priority level of each cell at the UNI, the cells are transmitted 48 to the network, such as to a node of the network. A network node, upon arrival of a cell transmitted from the UNI, performs a cell filtering process by which the node determines whether to accept or discard a particular cell. The cell filtering process involves determining 50 the state of one or more buffers or memories of the network node to determine a buffer or memory occupancy level. The node accepts or discards 52 a cell based on the priority level of the cell and the state of the node buffer. Cells that meet the filtering criteria determined at the node are accepted, buffered, and eventually transmitted 54 to another node in the network or another network in a manner consistent with the expected quality of service for the connection.

Figure 2:
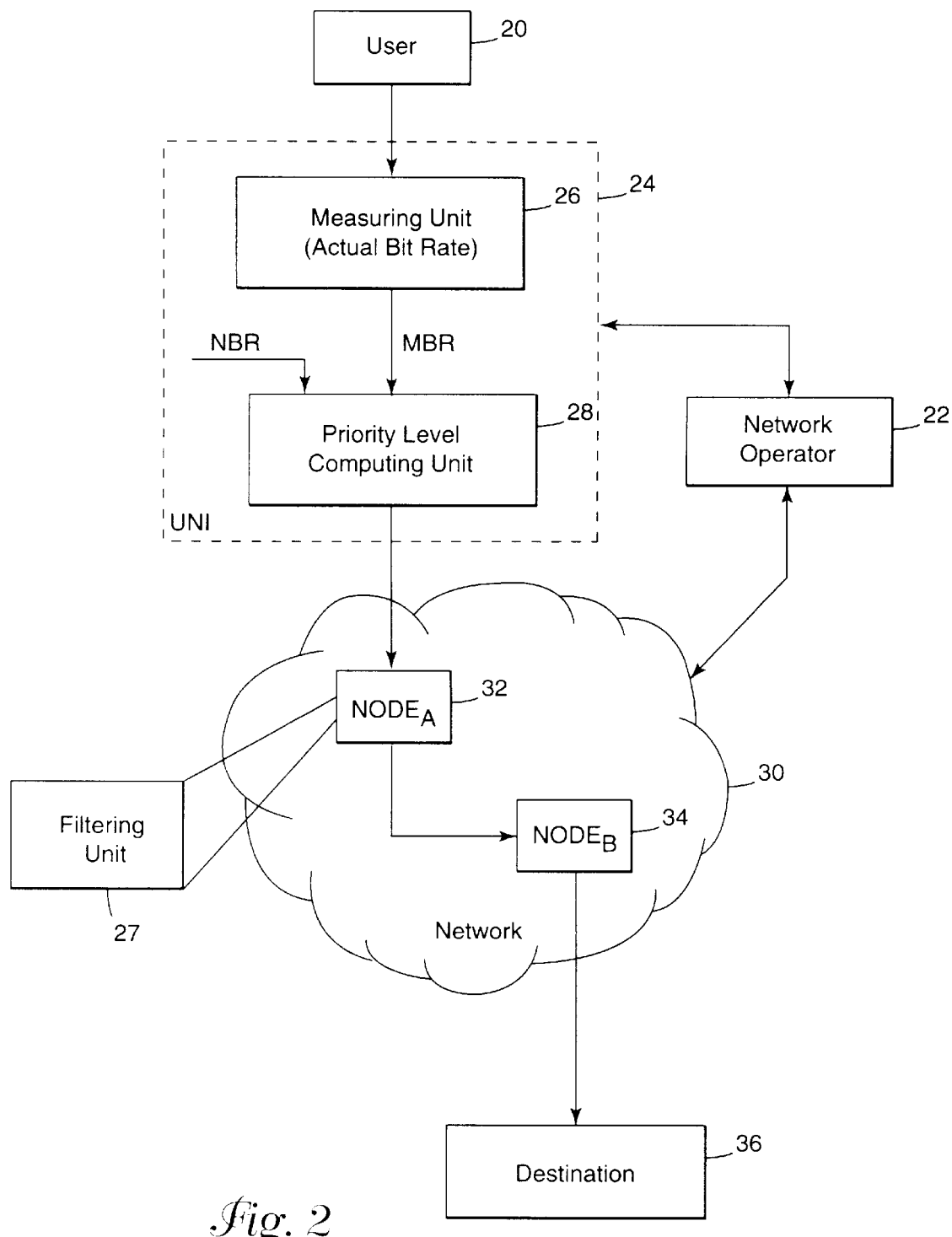
FIG. 2 is a system block diagram of a nominal bit rate service architecture in accordance with an embodiment of the present invention.

Concerning the embodiment illustrated in block diagram form in FIG. 2, there is shown a user 20 that employs a to communicate with a network 30. The user 20 negotiates a nominal bit rate with the network operator 22. The network operator 22 evaluates the user's NBR request based on a number of factors, including the NBR negotiated with other users 20, the number and nature of different connections associated with other users of the network, and other factors affecting network capacity and traffic flow. In principle, NBR can be zero, in which case all cells communicated through the are given lowest priority within the network 30. The value of NBR may also be greater than the transmission capacity at the UNI 24. If the value of NBR is significantly greater than the transmission capacity, for example, all cells transmitted from the are given highest priority within the network 30. It is noted that the priority level of a cell as defined herein has meaning within a network or a number of networks that embraces the NBR service concept. Cells that traverse beyond a network that offers an NBR service, such as by use of an network/network interface (NNI), may be processed in accordance with the traffic management strategy employed by such other network.

In contrast to conventional network services which are designed to provide a guaranteed quality of service, the network operator 22 does not guarantee the continuous availability of the user negotiated NBR. A properly dimensioned network, however, should provide adequate bandwidth to virtually ensure, although not guarantee, the availability of an established NBR. It is noted that all users who are transmitting data with an equivalent NBR encounter approximately the same quality of service.

Having established an NBR with the network operator 22, the user 20 is permitted to communicate information to a desired destination 36 via the network 30. A measuring unit 26 measures the actual or instantaneous bit rate (i.e., MBR) of each cell communicated between the and the network 30. Prior to departure of a cell from the UNI 24, a priority level computing unit 28 determines a priority level for the cell using the negotiated NBR and the MBR. In accordance with one embodiment, one of eight priority levels may be attributed to a given cell. The priority level computing unit 28 determines the priority level of a particular cell by computing a ratio of MBR to NBR. The priority level determined by the computing unit 28 is assigned to the cell which is then transmitted from the to the network 30.

The transmits the cell, which contains priority level information, to a node of the network 30, such as node$_A$ 32. The node$_A$ 32 accepts or discards the cell received from the based on the priority level of the cell and the buffering capacity of node$_A$ 32. In general, as the occupancy of the buffer or memory of node$_A$ 32 increases (i.e., becomes more filled), cells having a lower priority (i.e., higher priority level value) are discarded in favor of accepting cells having a higher priority (i.e., lower priority level value). As the occupancy level of the buffer of node$_A$ 32 decreases (i.e., becomes less filled), node$_A$ 32 becomes increasingly tolerant toward accepting cells of lower priority (i.e., higher priority level values). Cells that are buffered in node$_A$ 32 are subsequently transmitted to another node in the network 30, such as node$_B$ 34, or other network and, ultimately, to an end-destination 36.

Figure 3:
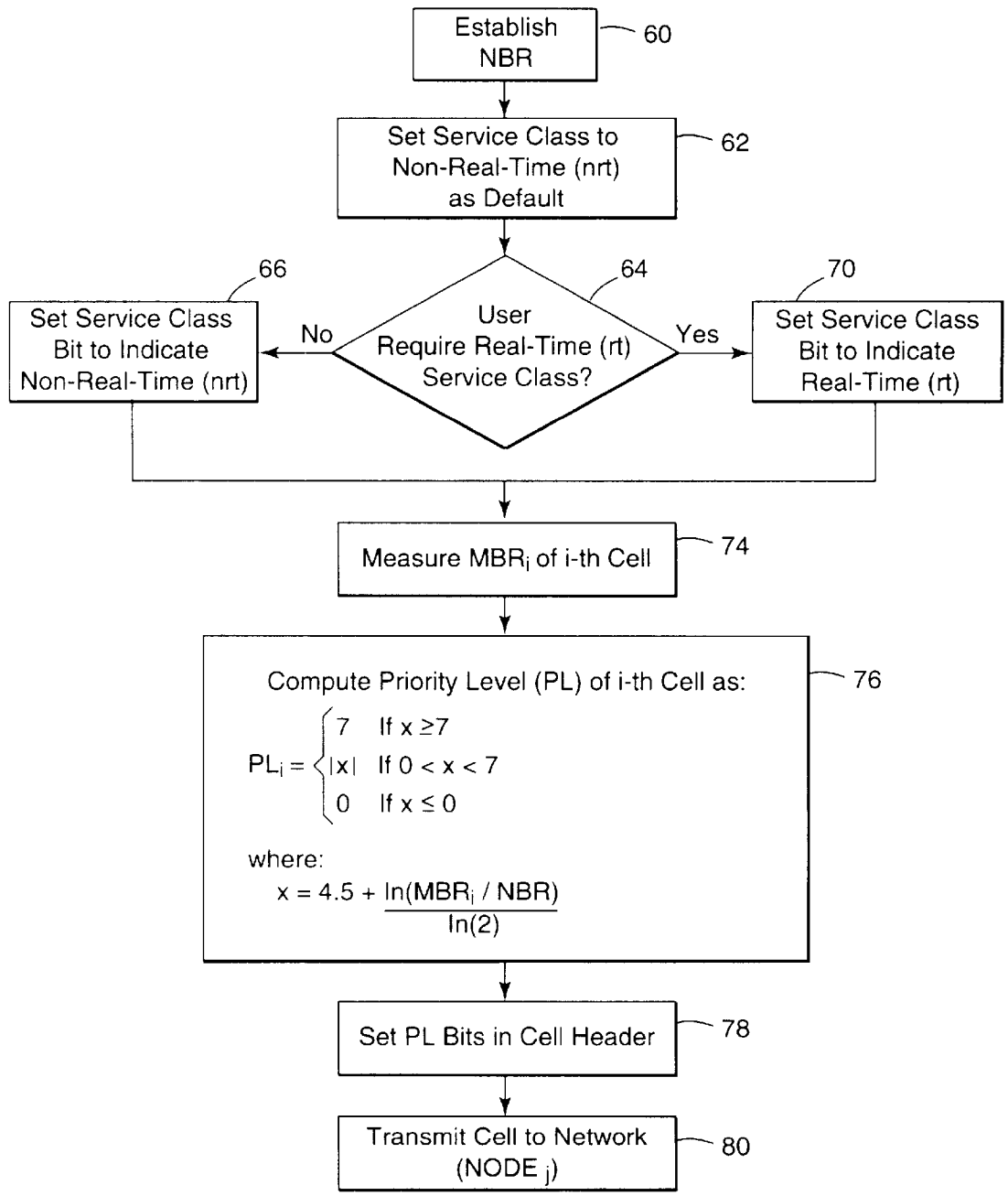
FIG. 3 illustrates in greater detail a procedure for transmitting cells of information between a user/network interface and a network using a nominal bit rate service in accordance with another embodiment of the present invention.
Figure 4:
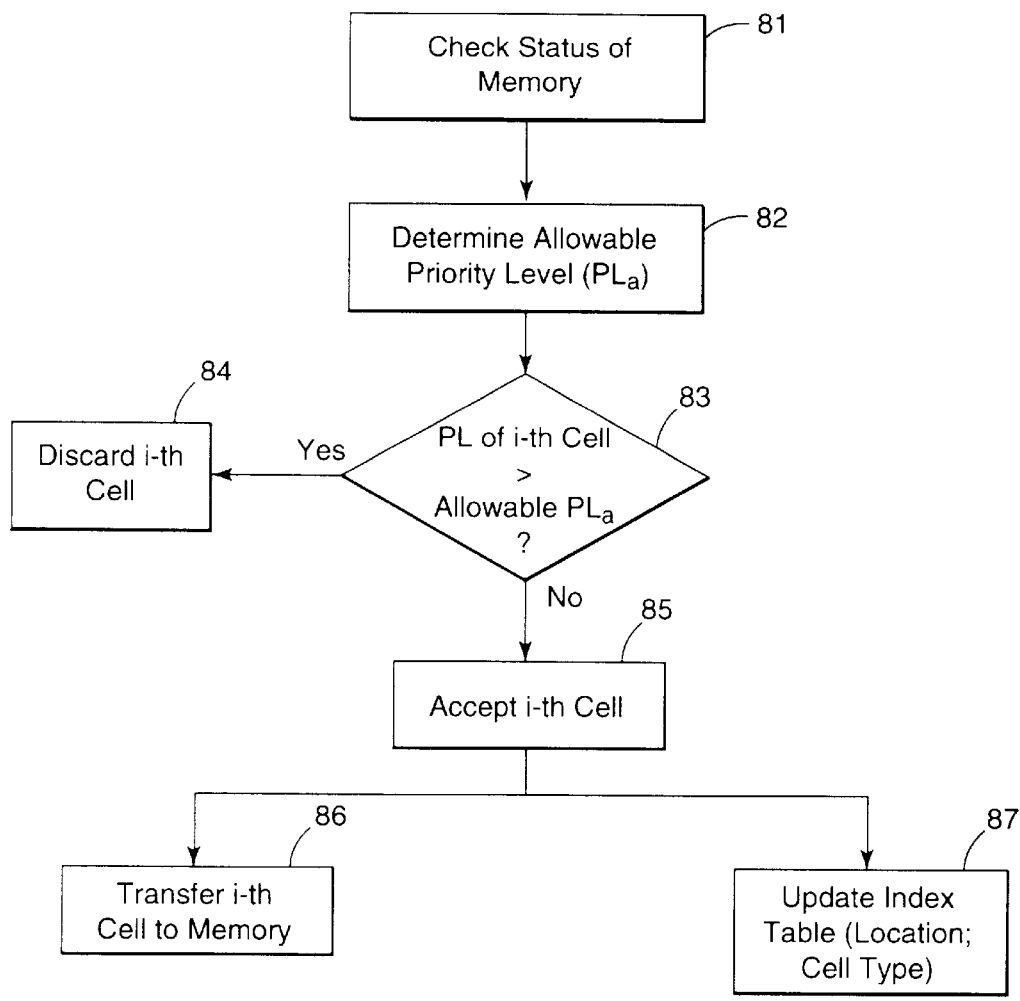
FIG. 4 illustrates in flow diagram form a general procedure for filtering cells at a network node in accordance with an embodiment of a nominal bit rate service.

FIGS. 3 and 4 illustrate in greater detail a procedure by which a network node or switch schedules and buffers cells in accordance with one embodiment of an NBR service methodology. As discussed previously, a user establishes 60 an NBR with the network operator 22. It may be desirable, although not required, to initially set the service class 62 to a non-real-time (nrt) service class as a default setting. Depending on a particular application, the user may require a real-time (rt) service class 64, which may be set by the user directly or, typically, by the user's application or communications software. If the user requires a real-time connection, each cell transmitted from the user's will have the service class bit in the cell header set to indicate that the payload of the cell contains real-time information 70. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service is class condition remains operative. As such, the rt/nrt service class bit of each cell header is set to indicate that the payload of the cell includes non-real-time information 66. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the and the network 30 is measured 74. Since, in practice, the actual bit rate may be subject to significant variability over time, the measuring unit 26 of the employs an averaging measuring principle to determine the actual or instantaneous bit rate, $MBR_i$.

In general, the measures 74 the actual bit rate of a cell, such as $cell_i$, by approximating the actual or instantaneous bit rate of the connection within a measuring period having a duration that is appropriate for the particular connection (e.g., a real-time or non-real-time connection). The instantaneous bit rate, $MBR_i$, may be determined using a known technique or by implementing a scheme in accordance with the following measuring concept.

In practice, since the actual bit rate may change significantly, it is desirable to apply an averaging measuring approach. The time scale of the measurement is dependent on the service class (real-time or non-real-time) associated with the cell or connection. The following measuring approach is based on a technique of computing an exponential moving average. For purposes of illustration, and not of limitation, it is assumed that the exponential moving average is calculated during each time slot of a The measuring unit 26 at the measures on the load of the connection between the and the network 30 at the instant of transmission of the i:th cell, referred to herein as $cell_i$. The load, $\rho_I$, of the connection may be determined by application of the following equation:

$$\rho_i = (1-\alpha)^{N_i} \rho_{i-1} + \alpha \qquad [1]$$

where, $N_i$ represents the distance between the (i:th) cell, $cell_i$, and the (i:th−1) cell, $cell_{i-1}$, measured in time slots, and $\alpha$ represents a parameter which defines the time scale of the averaging process.

Equation [1] is derived by assuming that the estimation process for determining the instantaneous load of a connection is updated during each time slot, but that all calculations are performed only at the instant of cell arrival at the measuring unit 26. The network operator 22 may use the following initial values for Equation [1]:

$\rho_0 = 0$; and $N_1 = C/NBR$ where, C represents the connection capacity measured in bits per second at the UNI 24.

In order to determine an accurate steady-state value for a desired constant bit rate connection, the following conversion between load ($\rho_i$) and measured bit rate ($MBR_i$) may be applied:

$$MBR_i = \frac{C \ln(1-\alpha)}{\ln\left(1 - \frac{\alpha}{\rho_i}\right)} \qquad [2]$$

For the condition of $N_i > 10/\alpha$, Equations [1] and [2] may be combined and approximated by the following equation:

$$MBR_i = \frac{C}{N_i} \qquad [3]$$

In a typical implementation, the time scale, or time slots, defined for the averaging process is substantially constant, and as such, the parameter $\alpha$ may be assumed to be substantially constant. Given these assumptions, which are not to be construed as requirements, the derivation of $MBR_i$ in Equation [2] may be approximated by employment of a table having proper granularity. For similar reasons, at least the term $(1-\alpha)^{N_i}$ in Equation [1] may also be tabulated.

The proper value for the time scale parameter, $\alpha$, depends largely on the capacity of the buffer or memory reserved for the service class used by the connection. By way of example, a buffer employed to accept cells from a real-time connection requiring a relatively small CDV should be relatively small in size, and as such, the value of $\alpha$ must be quite high. On the contrary, when using a non-real-time service, a user typically wants to send bursts of cells without encountering high cell loss ratios. As such, $\alpha$ must be much smaller or, alternatively, the averaging period should be much longer.

For purposes of determining an estimated value for the time scale parameter $\alpha$, and assuming that no performance analysis data is available, the following approximation may be applicable:

$$\alpha \approx 5/K_j, \qquad [4]$$

where, $K_j$ represents the buffer capacity measured in cells reserved for a particular service class j. For example, a buffer capacity of 200 cells may be appropriate for a real-time service class, while a buffer capacity of 20,000 cells may be appropriate for a non-real-time service class. In this example, and applying Equation [4] above, the time scale parameter, $\alpha$, associated with the real-time buffer is 5/200 or 0.025. The time scale parameter, $\alpha$, associated with the non-real-time buffer is 5/20,000 or 0.00025.

EXAMPLE #1

For purposes of illustration, and not of limitation, the following example of an application of the above-enumerated equations is provided. In this example, it is assumed that: two real-time connections or sources, $S_1$ and $S_2$, are transmitting cells; the buffer capacity, $K_j$, for the real-time service connections is 200 cells; the time scale parameter, $\alpha$, may be approximated using Equation [4] above such that $\alpha = 5/200$ or 0.025; the link capacity is C; and that for both connections, $S_1$ and $S_2$, $r(0) = 1/50$, where r represents the connection load. It is also assumed that: connection $S_1$ is transmitting evenly distributed cells with a constant interarrival time of $N_i = 50$ time slots, with $NBR_1 = C/50$.

It is further assumed that connection $S_2$ is transmitting cells periodically in a way that the interarrival times between successive cells are 10 and 90, and $NBR_2 = C/50$. If the time slots, $N_i$, are associated with cells designated by successive integers of increasing magnitude (i.e., 1, 2, 3, etc.), the arrival schedule for the cells of the connections, $S_1$ and $S_2$, may be represented by the relationship $N_j(cell_i)$.

In this example, the cell arrival schedule for connection $S_1$ may be represented as: 50(cell-1); 50+50(cell-2) or 100(cell-2); 100+50(cell-3) or 150(cell-3); 150+50(cell-4) or 200 (cell-4); 200+50(cell-5) or 250(cell-5), etc. The arrival schedule for the cells of connection $S_2$ may be represented as: 50(cell-1), 50+10(cell-2) or 60(cell-2), 60+90(cell-3) or 150(cell-3), 150+10(cell-4) or 160(cell-4), 160+90(cell-5) or 250(cell-5), etc.

For the real-time connection $S_1$, the following computations for each cell (first three cells shown below) may be made given by the above conditions and equations as:

$$r(\text{cell-1}) = 0.02(1-\alpha)^{50} + \alpha = 0.03064$$

$$r(\text{cell-2}) = 0.03064(1-\alpha)^{50} + \alpha 0.033643$$

$$r(\text{cell-3}) = 0.033643(1-\alpha)^{50} + \alpha 0.03449$$

The corresponding MBR values for the first three cells are as follows. A sample MBR computation for cell-1 is give below as:

$$MBR_{cell-1} = \frac{\ln(1-0.025)}{\ln\left(1-\frac{0.025}{0.03064}\right)} C = 0.01496C$$

$$MBR_{cell-2} = 0.01863C$$

$$MBR_{cell-3} = 0.01962C$$

It is noted that the constant C, which represents the link capacity, cancels out in subsequent computations. Using Equation [5] provided hereinbelow, the priority level of each cell may then be computed. A priority level computation involving the first cell (cell-1) is given as an example by the following:

$$PL_{cell-1} = \text{int}\left(4.5 + \frac{\ln\left(\frac{0.01496}{0.02}\right)}{\ln(2)}\right)$$

$$PL_{cell-1} = \text{int}(4.081)$$

$$PL_{cell-1} = 4$$

where, int(x) represents the integer part of the real number x. It can be seen by continuing the priority level computations for subsequent cells that all cells communicated over connection $S_1$ are assigned a priority level of 4.

For the second real-time connection $S_2$, similar computations for the first four cells result in the following:

$$r(\text{cell } 1) = 0.02(1-\alpha)^{50} + \alpha = 0.03064$$

$$r(\text{cell } 2) = 0.03064(1-\alpha)^{10} + \alpha = 0.04879$$

$$r(\text{cell } 3) = 0.04879(1-\alpha)^{90} + \alpha = 0.03000$$

$$r(\text{cell } 4) = 0.03000(1-\alpha)^{10} + \alpha = 0.04829$$

MBR(cell-1)=0.01496C

MBR(cell-2)=0.03525C

MBR(cell-3)=0.01413C

MBR(cell-4)=0.03472C

Computing the priority level for the first six cells of connection $S_2$, for example, results in the following cell priority level designations:

$PL_{cell-1} = 4$ $PL_{cell-2} = 5$ $PL_{cell-3} = 3$ $PL_{cell-4} = 5$ $PL_{cell-5} = 3$ $PL_{cell-6} = 5$ Referring once again to FIG. 3, and having determined 74 the measured bit rate, $MBR_i$, of the i:th cell, the priority level computing unit 28 computes 76 the priority level of the i:th cell using the measured bit rate, $MBR_i$, and the nominal bit rate, NBR. In accordance with one embodiment, it is assumed that a cell may be distinguished from other cells using a cell prioritization scheme that employs eight priority levels. The illustrative example provided above, for example, assumes the availability of one of eight priority levels that may be assigned to a cell. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header format of the ATM specification. As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n-bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

The priority level computing unit 28 determines 76 the priority level of each cell, such as $cell_i$, using the computed value of $MBR_i$ and the value of NBR. In accordance with one embodiment of the present invention, and assuming that the measured bit rate is $MBR_i$ when the i:th cell is transmitted to the network 30, the priority level ($PL_i$) of $cell_i$ may be calculated using the following equation:

$$x = 4.5 + \frac{\ln(MBR_i/NBR)}{\ln(2)} \qquad [5]$$

-continued $$PL_i = \begin{cases} 7 & \text{if } x \geq 7 \\ \lfloor x \rfloor & \text{if } 0 < x < 7, \\ 0 & \text{if } x \leq 0 \end{cases}$$

where, $\lfloor x \rfloor$ represents the integer part of x. As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [5] above may be modified so as to produce cell priority levels ranging between PL=1 and PL=7, such that $\lfloor x \rfloor$ represents the integer part of x, if 1<x<7.

It can be seen by application of Equation [5] above that if a connection is exploiting network capacity in excess to the connection's negotiated NBR value, the priority level of $\text{cell}_i$ is at least 4. It can further be seen that if the momentary bit rate at the is less than the negotiated value of NBR, PL is at most 4.

The priority level scheme in accordance with this embodiment of the present invention thus permits adjustments of the relative capacity used by a connection in steps of 2. This result can be seen from the tabulated sample data provided in Table 1 below developed using Equation [5] above.

TABLE 1

| NBR (kbit/sec) | MBR (kbit/sec) | x | Priority Level (PL) |
|---|---|---|---|
| 100 | 566 | 7.00 | 7 |
| 100 | 348 | 6.30 | 6 |
| 100 | 204 | 5.53 | 5 |
| 100 | 100 | 4.50 | 4 |
| 100 | 49 | 3.47 | 3 |
| 100 | 18 | 2.03 | 2 |
| 100 | 12.7 | 1.52 | 1 |
| 100 | 8.8 | 0.99 | 0 |

From Table 1 above, it can be seen that if MBR is higher than 566 kbit/sec, PL is 7, and if MBR is lower than 8.8 is 0.

The three priority level bits allocated in the cell header are set 78 for each ATM cell transferred from the UNI 24. The ATM cells are then transmitted 80 to targeted network $\text{nodes}_j$ identified by node addressing information provided in the cell header.

It is noted that if a user 20 is not satisfied with the quality of service of the connection, the user 20 may elect between at least three alternatives. First, the user 20 may elect to keep the average bit rate unchanging, but reduce the variation of traffic process. Second, the user 20 may elect to decrease the rate, or to increase the nominal bit rate. Increasing the NBR will, however, generally result in a concomitant increase in cost for a higher speed operator 22.

In the above-description for measuring the actual bit rate or MBR of a cell, cell priority is determined according to the instantaneous cell rate of a particular connection. Measuring the MBR based solely on a sampling of the instantaneous cell rate at a particular moment in time, however, may not take into account whether a particular user has utilized a greater or lesser amount of network capacity prior to the time of sampling. Accordingly, it may be desirable to sample the transmission rate of cells over a particular connection a number of times or over a greater duration of time.

For a user that has exploited a relatively low level of network capacity over a given period of time in comparison to a user who continuously uses a relatively high level of network capacity, it may be desirable to reward the first user for exploiting less network capacity overall, such as by increasing the priority of a current cell. Such a measuring approach may be particularly useful when distinguishing between high average network capacity users and low average network capacity users, especially when such users are utilizing connections supporting variable bit rate video coding.

Figure 11:
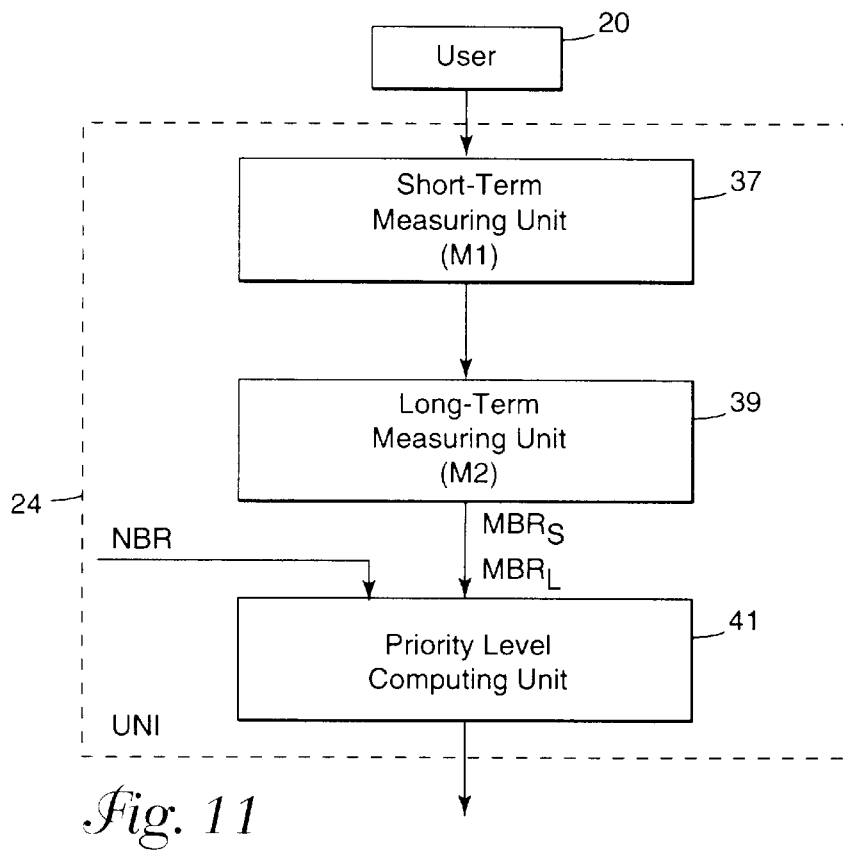
FIG. 11 is a block diagram of an embodiment of a user/network interface including a short-term measuring unit and a long-term measuring unit for determining a short-term and a long-term cell transmission rate of a connection, respectively.

With reference to FIG. 11, there is illustrated a depiction of a user/network interface 24 which may be viewed as replacing the UNI 24 illustrated in FIG. 2. The illustrated in FIG. 11, in contrast to that illustrated in FIG. 2, includes a short-term measuring unit M1 37 and, in addition, includes a long-term measuring unit M2 39. Each of these short-term and long-term measuring units M1 37 and M2 39 measures the actual bit rate of a connection over different time durations. The short-term measuring M1 37, for example, may measure the actual bit rate of a real-time connection by using measuring periods on the order of 0.1 ms, and measuring periods on the order of 10 ms for non-real-time connections.

The long-term measuring unit M2 39, in contrast, determines the actual bit rate of either a real-time or a non-real-time connection by utilizing measuring periods on the order of minutes, such as 10 minutes for example. The priority level computing unit 41 thus receives two MBR values, an $MBR_s$ value received from the short-term measuring unit M1 37 and an $MBR_l$ received from the long-term measuring unit M2 39. The priority level computing unit 41, using the values of $MBR_s$, $MBR_l$, and NBR, computes the priority level for each cell in a manner previously described hereinabove.

Figure 12:
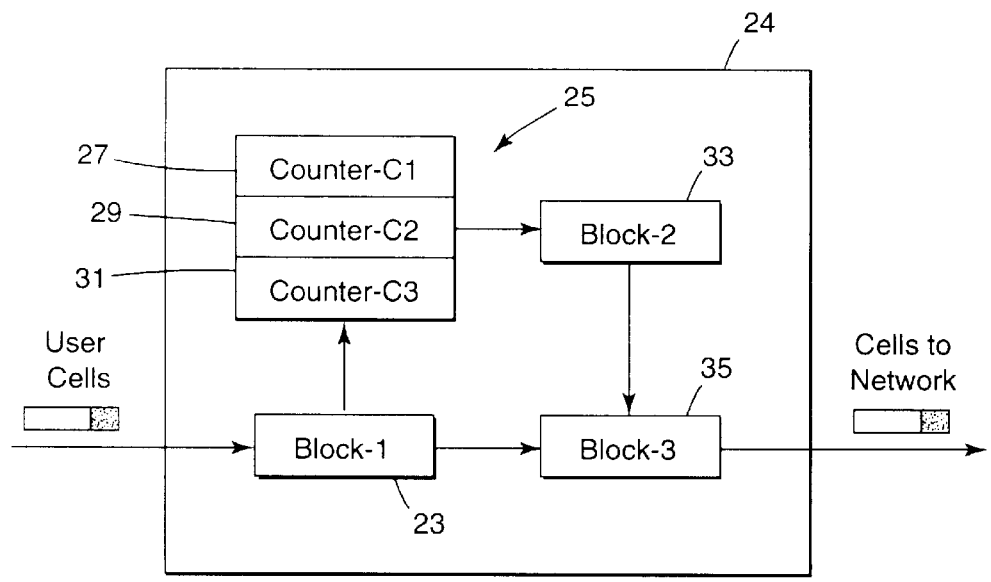
FIG. 12 illustrates in block diagram form another embodiment of a user/network interface including a short-term measuring unit and a long-term measuring unit.
Figure 13:
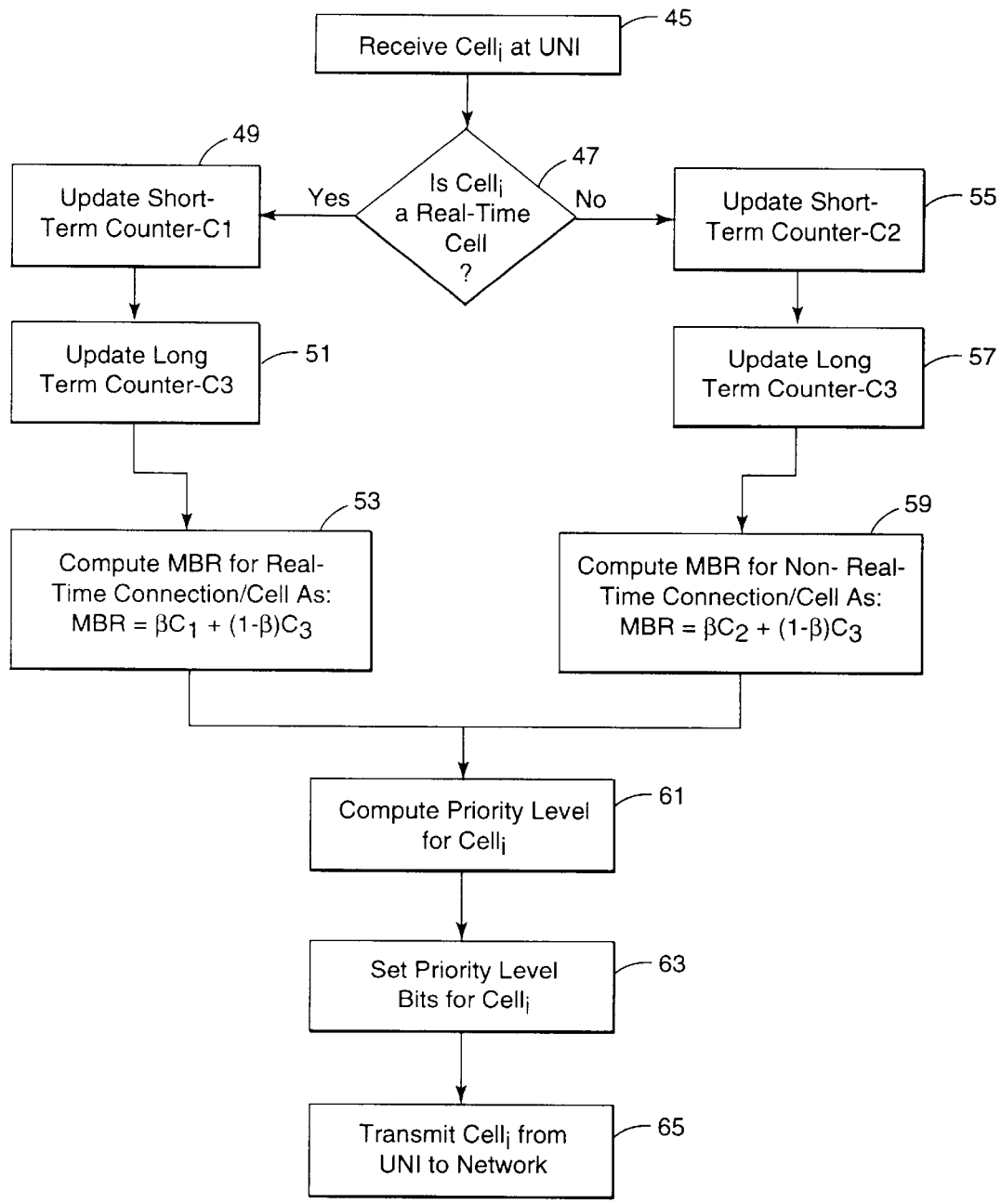
FIG. 13 is a flow diagram illustrating various process steps implemented by the user/network interface shown in FIG. 12.

With regard to FIGS. 12 and 13, there is illustrated in system block diagram form and flow diagram form, respectively, an embodiment of the UNI 24 illustrated in FIG. 11 which utilizes both short-term and long-term measuring units M1 37 and M2 39. Initially, a cell, such as $\text{cell}_i$, is received 45 at the UNI 24. At Block-1 23, a determination 47 is made as to whether $\text{cell}_i$ is a real-time cell or a non-real-time cell. If Block-1 23 determines that $\text{cell}_i$ is a real-time cell, Block-1 23 updates 49 the value of the short-term Counter-C1 27 provided in a counter unit 25. The value of the short-term Counter-C1 27 reflects the current short-term bit rate for real-time cells over a measuring period of approximately 0.1 ms.

Block-1 23 also updates 51 the value of the long-term Counter-C3 31, which reflects the current long-term bit rate of the connection using a measuring period of several minutes, such as 10 minutes. As such, the current long-term bit rate of the connection over the past 10 minutes is reflected in the long-term Counter-C3 31. Block-2 33 calculates the composite or total measured bit rate, MBR, for the real-time connection or cell based on both the current short-term and long-term bit rates reflected in Counters C1 27 and C3 31, respectively. The value of MBR for the real-time connection or cell is given by:

$$MBR = \beta C_1 + (1-\beta)C_3 \qquad [6]$$

where, $\beta$ is a constant between zero and one, and $C_1$ and $C_3$ represent the values of the current short-term and long-term bit rates stored in Counters C1 27 and C3 31, measured in kbit/sec, respectively.

After computing the composite MBR for the real-time connection or cell, the priority level of $\text{cell}_i$ is computed 61 by Block-2 33. Block-3 35 sets 63 the priority level bits for $\text{cell}_i$, and then transmits 60 $\text{cell}_i$ from the UNI 24 to the network 30.

If it is determined 47 that $cell_i$ received at the UNI is a non-real-time cell, Block-1 23 updates 55 the value of the short-term Counter-C2 29. The value of the short-term Counter-C2 29 represents the current short-term bit rate for non-real-time cells or connections, typically measured over a duration of approximately 10 ms. Block-1 23 also updates 57 the previously described. Block-2 33 then computes 59 the composite MBR for the non-real-time connection or cell as:

$$MBR=\beta C_2+(1-\beta)C_3 \qquad [7]$$

where, $\beta$ is a constant between zero and one, and C2 and C3 respectively represent the values of the short-term Counter-C2 29 and the long-term Counter-C3 31, measured in kbit/sec. After the MBR has been computed 59 for the non-real-time connection or cell, Block-2 33 computes 61 the priority level of the non-real-time cell, $cell_i$. Block-3 35 sets 63 the priority level bits for $cell_i$, and transmits 65 the non-real-time $cell_i$ from the UNI 24 to the network 30.

Figure 5:
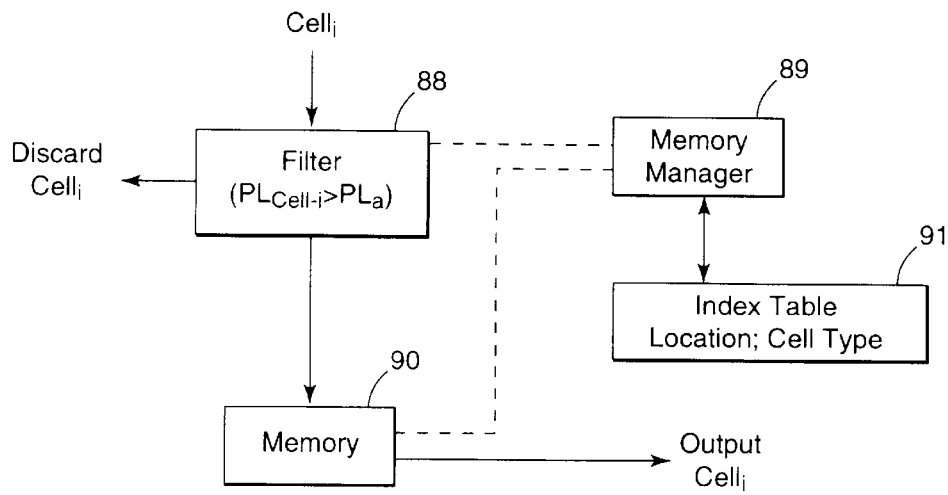
FIG. 5 is a block diagram of an embodiment of a system for filtering cells at a network node in accordance a nominal bit rate service.

Referring now to FIG. 4, there is illustrated in flow diagram form a general methodology by which a network node processes cells containing priority level information received from a UNI 24 in accordance with one embodiment of the present invention. FIG. 5 illustrates an embodiment of various components of a network node employed to effectuate the methodology illustrated in FIG. 4. It is assumed that a cell, such as $cell_i$, has been processed at a UNI 24 and includes priority level information derived in a manner described hereinabove.

$Cell_i$ is transmitted from the to a network node and is received at a filter 88 of the node. A memory manager 89 checks the status 81 of the memory 90 in order to determine the occupancy in the memory 90. The memory manager 89 determines 82 the allowable priority level ($PL_a$) based on the occupancy state of the memory 90. In general, the memory manager 89 establishes a high allowable priority which translates to a low allowable priority "level," for example $PL_a=0$ or 2, when the occupancy level of the memory 90 is high (i.e., few available memory locations). When the memory manager 89 determines that the memory 90 has ample capacity for receiving new cells, the memory manager 89 establishes a low allowable priority which translates to high allowable priority "level," for example $PL_a=6$ or 7. As will be appreciated by those skilled in the art, the calculation of $PL_a$ could alternatively be based on unoccupied buffer capacity rather than on buffer occupancy without departing from the spirit of the invention.

If the priority level of $cell_i$ is greater than the allowable priority level, $PL_a$, as determined 83 by the memory manager 89, the filter 88 discards 84 $cell_i$. If, on the other hand, the priority level of $cell_i$ is equal to or less than the allowable priority level $PL_a$, the filter 88 accepts 85 $cell_i$. The memory manager 89 coordinates the transfer 86 of $cell_i$ to the memory 90 and updates an index table 91 coupled to the memory manager 89 to include a new index table entry for newly accepted $cell_i$. In one embodiment, the index table 91 stores the location of the accepted $cell_i$ in the memory 90, and also stores a cell-type indicator which specifies whether $cell_i$ is a real-time cell or a non-real-time cell. As such, the memory 90 may store both real-time and non-real-time cells.

The memory manager 89, in cooperation with the index table 91, manages cell transfer operations from the memory 90 to the output of the memory 90 by giving preference to the real-time cells over the non-real-time cells. By way of example, the memory manager 89, upon determining the presence of both rt-cells and nrt-cells stored in the memory 90, transfers all of the rt-cells to the output of the memory 90 prior to transferring out any of the nrt-cells.

Figure 7:
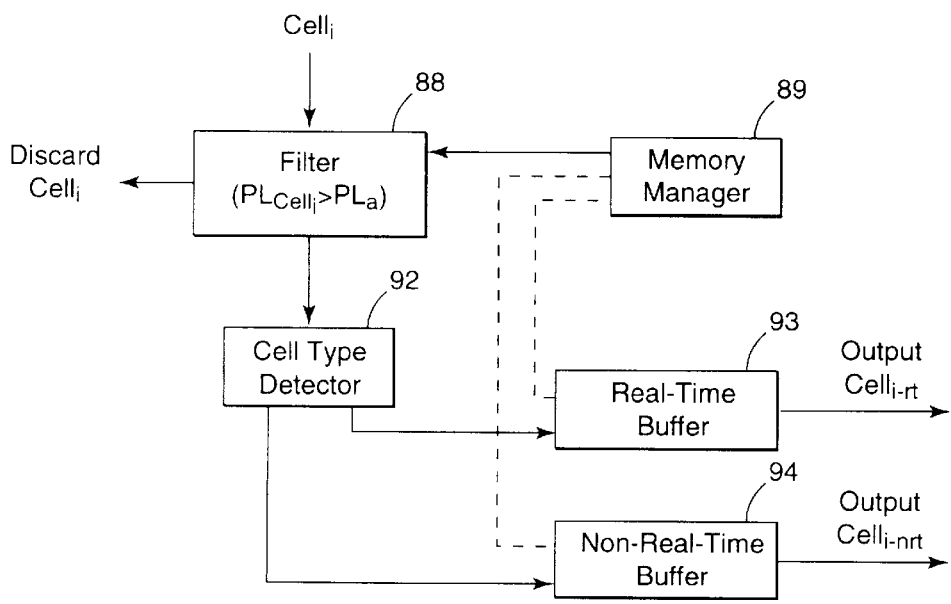
FIG. 7 is a block diagram of an alternative embodiment of a system for filtering cells at a network node in accordance with a nominal bit rate service.
Figure 6:
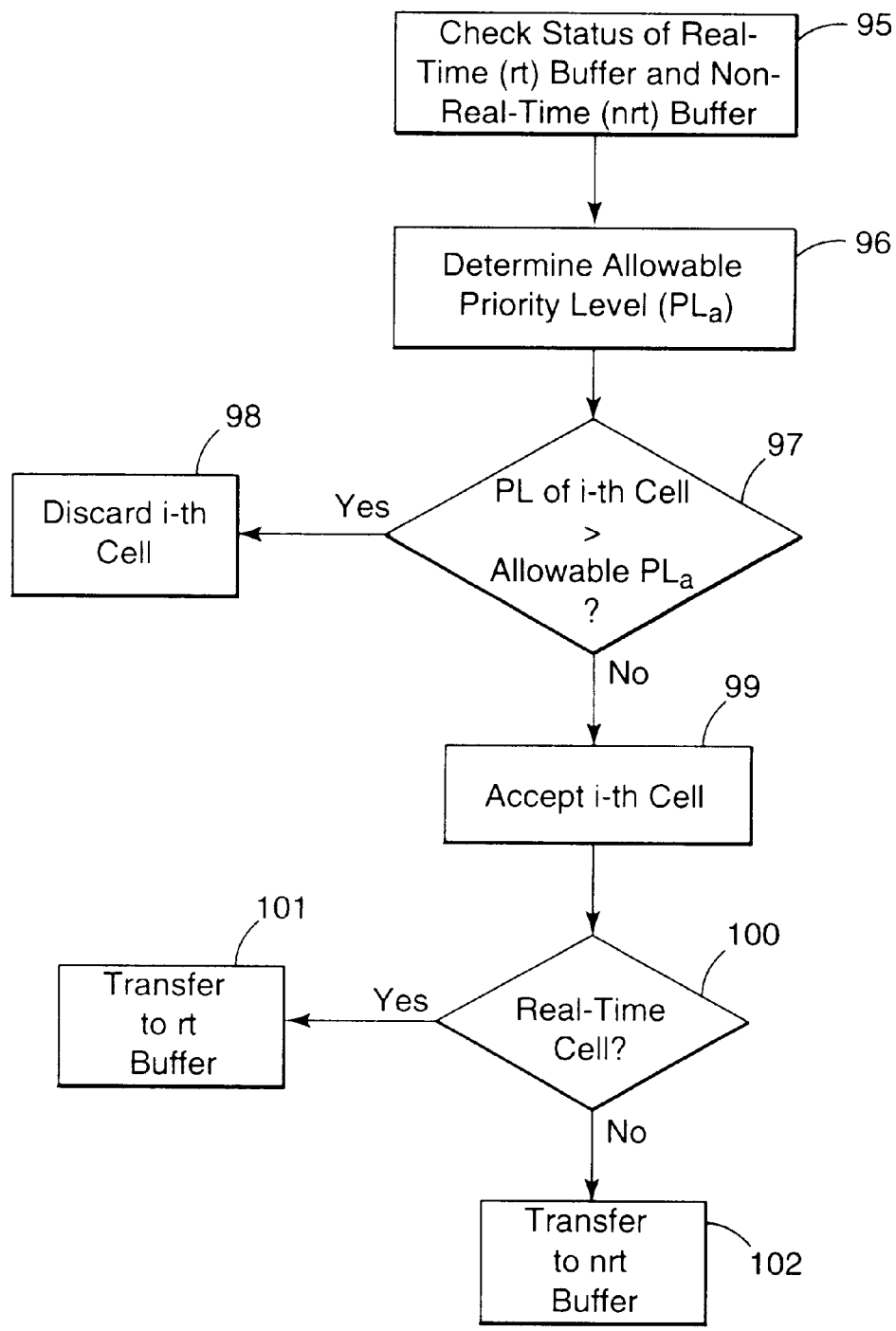
FIG. 6 illustrates in flow diagram form a general procedure for filtering cells at a network node in accordance with an alternative embodiment of a nominal bit rate service.

In accordance with another embodiment, as is illustrated in FIGS. 6 and 7, a memory manager 89 determines 95 the status of a real-time buffer (rt-buffer) 93 and a non-real-time buffer (nrt-buffer) 94. The memory manager 89 determines 96, in a manner similar to that previously described, the allowable priority level, $PL_a$, for the filter 88 based on the status of the rt-buffer 93 and the nrt-buffer 94. If the priority level of $cell_i$ is greater 97 than the allowable priority level, $PL_a$, for the filter 88 discards 98 $cell_i$. If, on the other hand, the priority level of $cell_i$ is equal to or less than the allowable priority level, $PL_a$, $cell_i$ is accepted 99.

In accordance with another embodiment, as will be described later in greater detail, the network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 92 receives the accepted cell, $cell_i$, from the filter 88 and determines 100 whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 92, upon determining the service class type of the $cell_i$, transfers 101, 102 the $cell_i$ to either the rt-buffer 93 or the nrt-buffer 94. In a manner similar to that described previously with respect to FIGS. 4 and 5, the memory manager 89 coordinates the output of rt-cells and nrt-cells respectively from the rt-buffer 93 and the nrt-buffer 94, giving preference to the rt-cells.

Figure 8:
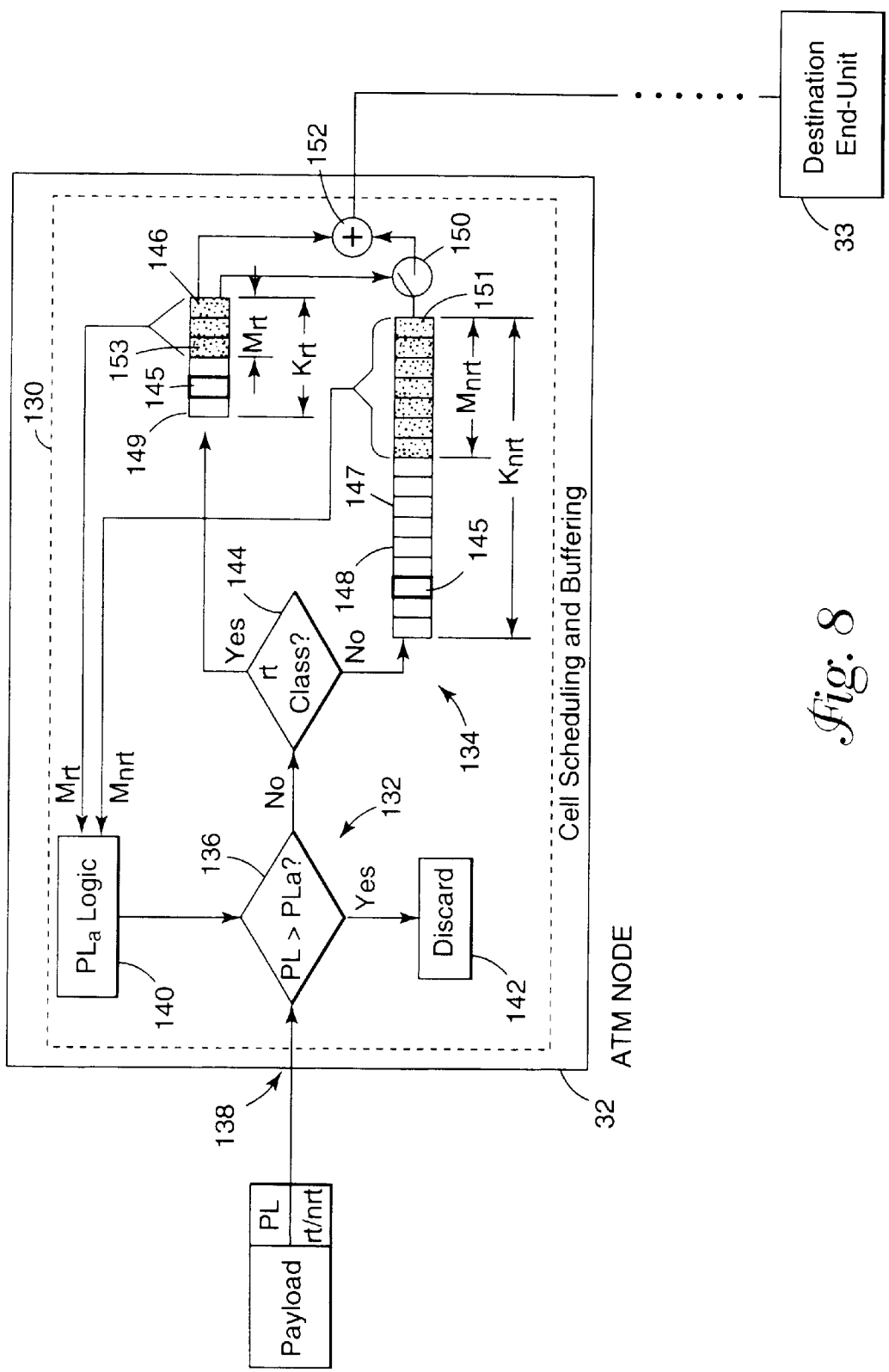
FIG. 8 is a diagram of a cell scheduling and buffering unit provided in a network node.
Figure 9:
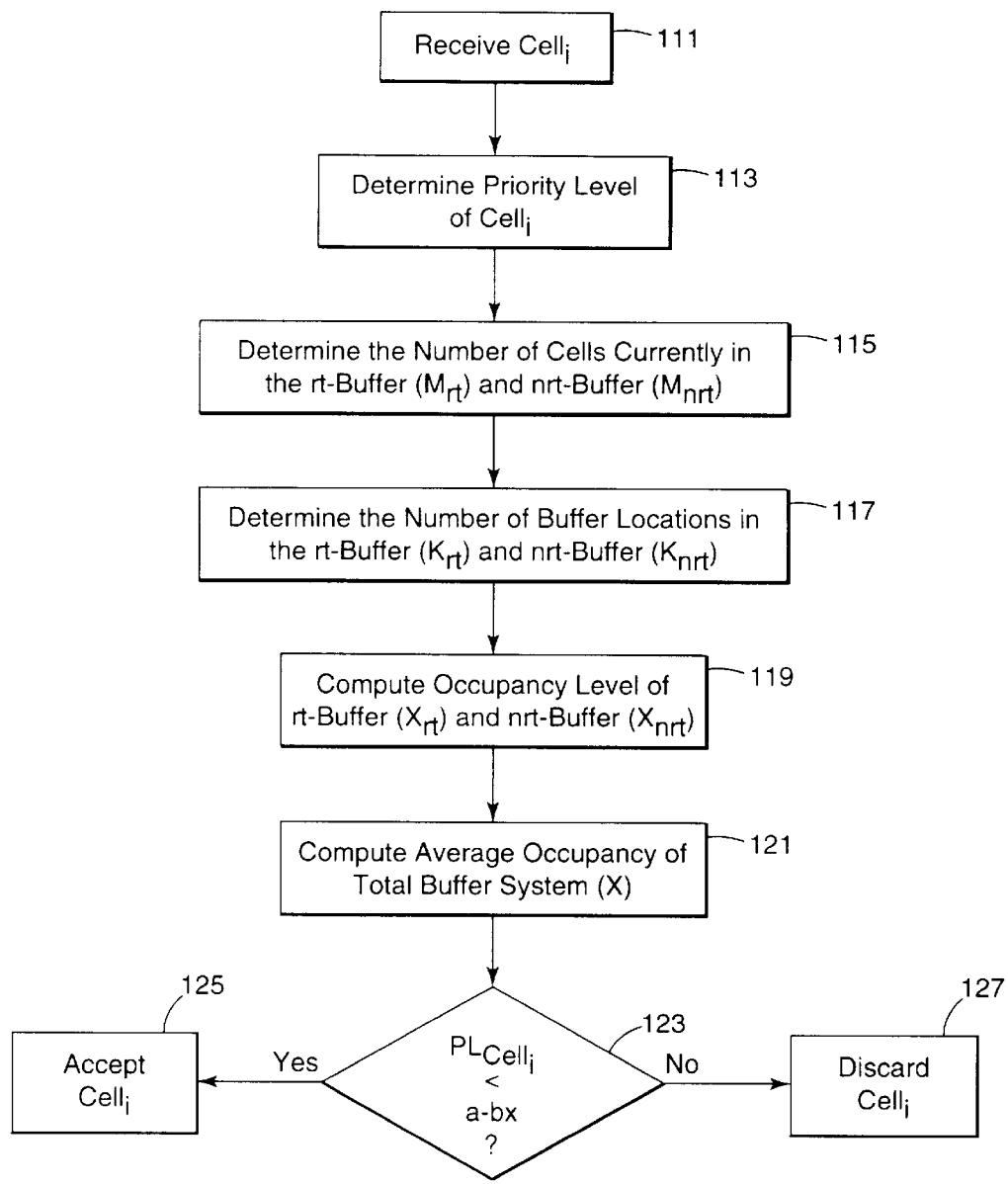
FIG. 9 is a flow diagram of a procedure for filtering cells at a network node.

Turning now to FIG. 8, there is illustrated a diagram of a cell scheduling and buffering unit 130 in accordance with one embodiment of the present invention. FIG. 9 depicts in flow diagram form a general procedure by which cells transmitted from a or other network node are processed by the cell scheduling and buffering unit 130 shown in FIG. 8. It is noted that the cell scheduling and buffering unit 130 may be viewed as a unit constituting two independent units, namely, a cell scheduling unit 132 and a cell buffering unit 134. It is understood that each cell scheduling and buffering unit 134 may have several inputs 138, although only one input 138 is shown in FIG. 8.

As described hereinabove, each cell received at an ATM node 32 has associated with it a priority level previously established based on traffic conditions at a source UNI 24. In addition, each cell has associated with it a service class indicator which identifies the cell as containing real-time or non-real-time payload. The cell scheduling and buffering unit 130 provides for efficient processing of both real-time and non-real-time cells based solely on two external considerations: the priority level and the service class status of each cell. Those skilled in the art will readily appreciate that a cell scheduling scheme that only requires a limited amount of external information (i.e., cell priority level and service class) to effectuate node traffic control provides for the implementation of high capacity, low cost network switches.

As is illustrated in FIGS. 8 and 9, a cell, such as $cell_i$, is received 111 at an input 138 of the cell scheduling and buffering unit 130. A cell filter 136 determines 113 the priority level of $cell_i$ by reading the priority level bits of the cell header. As part of the cell filtering procedure, the allowable priority level, $PL_a$, is computed based on the current status of typically two buffers provided in the cell scheduling and buffering unit 130.

In accordance with one embodiment of the present invention, the cell scheduling and buffering unit 130 includes two buffers, a real-time buffer 146 and a non-real-time buffer 148. The occupancy level of the two buffers 146, 148 is computed by determining 115 the number of cells currently residing in the rt-buffer 146, denoted $M_{rt}$, and the number of cells currently residing in the nrt-buffer 148, denoted $M_{nrt}$.

It is noted that the shaded portion of the rt-buffer 146 represents an occupied rt-buffer portion 153, while the unshaded section represents an unoccupied rt-buffer portion 149. Similarly, an occupied nrt-buffer portion 151 of the nrt-buffer 148 is indicated by the shaded region, whereas the unshaded region represents an unoccupied nrt-buffer portion 147. It is further noted that each of the buffers 146, 148 include a number of buffer locations 145, and that the number of non-real-time buffer locations 145 defining the nrt-buffer 148 typically exceeds the number of buffer locations 145 defining the rt-buffer 146.

For purposes of illustration, and not of limitation, the following buffer parameters are defined:

$M_{rt}$=the number of cells in the rt-buffer 146

$K_{rt}$=the number of buffer places in the rt-buffer 146

$M_{nrt}$=the number of cells in the nrt-buffer 148

$K_{nrt}$=the number of buffer places in nrt-buffer 148

A processor, represented as $PL_a$ logic 140, determines 115 the number of cells currently occupying the rt-buffer 146 ($M_{rt}$) and the number of cells currently occupying the nrt-buffer 148 ($M_{nrt}$). The processor 140 also determines 117 the number of buffer locations 145 defining the rt-buffer 146 ($K_{rt}$) and the number of buffer locations 145 defining the nrt-buffer 148 ($K_{nrt}$). The occupancy levels of the rt-buffer 146 ($x_{rt}$) and the nrt-buffer 148 are respectively determined 119 using the following equations:

$$x_{rt}=M_{rt}|K_{rt}$$

$$x_{nrt}=M_{nrt}|K_{nrt} \qquad [8/9]$$

The average occupancy level of the total buffering system (x) is then determined 121 by one of several ways, including, for example, by use of any of the following equations:

$$x=(x_{rt}+x_{nrt}) \qquad (a)$$

$$x=\sqrt{x_{rt}^2+x_{nrt}^2} \qquad (b)[10a/b/c]$$

$$x=\max(x_{rt},x_{nrt}) \qquad (c)$$

The priority level of $cell_i$, $PL_{cell-i}$, is compared 123 to the result produced from use of the following equation:

$$PL<a-bx \qquad [11]$$

where, a and b are constants, and it is assumed for purposes of this example that a=b=9. $Cell_i$ is accepted 125 or discarded 127 depending on the result of the comparison performed using Equation [11] above.

It may be advantageous to determine the allowable priority level, $PL_a$, using an alternative approach. Initially, it is assumed that the occupancy level of the rt-buffer 146, $X_{rt}$, and that of the nrt-buffer 148, $x_{rt}$, are divided into N levels, where N may be, for example, 16 or 12. For purposes of illustration, Table 2 provided below assumes that the occupancy level of the two buffers 146, 148 are divided into N=12 levels. When a cell arrives at the cell processor 140 determines the current values of $M_{rt}$ and $M_{nrt}$. By use of a simple calculation, especially if $K_{rt}$, $K_{nrt}$, and N are of the form $2^n$, an estimate of the current occupancy level of both buffers 146, 148 may be obtained. These two values, $x_{rt}$ and $x_{nrt}$, determine the rows and columns of Table 2. The contents of each cell of Table 2 represents the highest allowed priority level, $PL_a$, in view of the current status of the two buffers 146, 148 upon arrival of $cell_i$.

TABLE 2

| | [12$x_{rt}$] | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| [12$x_{nrt}$] | | | | | | | | | | | | | |
| 0 | 7 | 7 | 7 | 7 | 6 | 6 | 5 | 4 | 3 | 2 | 1 | 0 | — |
| 1 | 7 | 7 | 7 | 7 | 6 | 6 | 5 | 4 | 3 | 2 | 1 | 0 | — |
| 2 | 7 | 7 | 7 | 6 | 6 | 6 | 5 | 4 | 3 | 2 | 1 | 0 | — |
| 3 | 7 | 7 | 6 | 6 | 6 | 5 | 5 | 4 | 3 | 2 | 1 | 0 | — |
| 4 | 6 | 6 | 6 | 6 | 5 | 5 | 4 | 4 | 3 | 2 | 1 | 0 | — |
| 5 | 6 | 6 | 6 | 5 | 5 | 4 | 4 | 3 | 3 | 2 | 1 | 0 | — |
| 6 | 5 | 5 | 5 | 5 | 4 | 4 | 3 | 3 | 2 | 2 | 1 | 0 | — |
| 7 | 4 | 4 | 4 | 4 | 4 | 3 | 3 | 2 | 2 | 1 | 1 | 0 | — |
| 8 | 3 | 3 | 3 | 3 | 3 | 3 | 2 | 2 | 1 | 1 | 0 | 0 | — |
| 9 | 2 | 2 | 2 | 2 | 2 | 2 | 2 | 1 | 1 | 0 | 0 | 0 | — |
| 10 | 1 | 1 | 1 | 1 | 1 | 1 | 1 | 1 | 0 | 0 | 0 | 0 | — |
| 11 | 0 | 0 | 0 | 0 | 0 | 0 | 0 | 0 | 0 | 0 | 0 | 0 | — |
| 12 | — | — | — | — | — | — | — | — | — | — | — | — | — |

It can be seen that Table 2 provides a useful estimate of the highest allowed priority level, $PL_a$, which reflects both the status and the relative sizes of the rt-buffer 146 and the nrt-buffer 148. An array of the values of Table 2 may be stored and updated as needed in non-volatile memory within the node 32.

Figure 10:
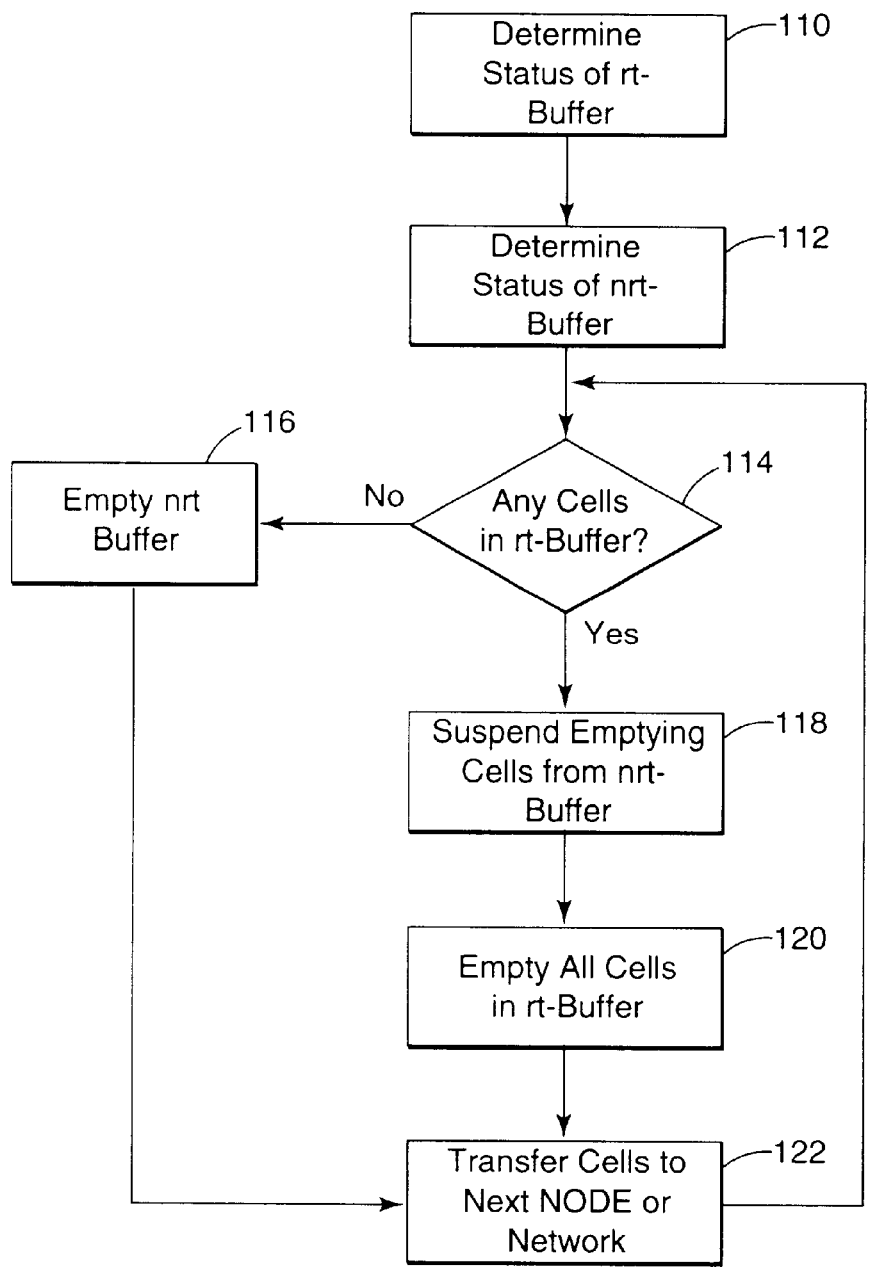
FIG. 10 is a flow diagram illustrating a procedure for controlling the transfer of cells buffered at a network node.

In accordance with another aspect of the present invention, an embodiment of which is illustrated in flow diagram form in FIG. 10, the memory manager 89 determines 110, 112 the status of the rt-buffer 93 and the status of the nrt-buffer 94. If the memory manager 89 detects 114 the presence of any cells in the rt-buffer 93, the memory manager 89 suspends 118 emptying from the nrt-buffer 94, and transfers out 120 all rt-cells from the rt-buffer 93. The rt-cells output from the rt-buffer 93 are then transmitted 122 to another node in the network, or to another network. If the memory manager 89 determines that the rt-buffer 93 is empty, the memory manager 89 coordinates the transfer 116 of nrt-cells from the nrt-buffer 94 which are then transferred to another node in the network or to another network.

It is noted that the cell stream process for a real-time connection should be very smooth if the user wants to achieve a relatively small cell loss ratio. This can be appreciated in view of the relatively short measuring period, approximately 0.1–0.3 ms for example, when determining the priority level of real-time cells at the UNI 24. If, for example, there occurs large bursts of real-time cells, then some of these cells will likely be marked with the lowest priority (i.e., PL=7). If the application does not require a small CDV, it is considered more desirable for the user to select the non-real-time service, because this service class allows for relatively large cell bursts to occur without producing significant changes in the value of PL.

For purposes of illustration, and not of limitation, examples are provided below to illustrate the relationship between the quality of service of an NBR or SIMA connection and throughput at different priority levels. The following examples demonstrate, in accordance with one embodiment of the present invention, the relative differences in QoS with respect to adjacent priorities, such as the QoS associated with PL=4 in comparison to that of PL=3. It is noted that a higher cost or fee is typically assessed to users who request a higher priority for cells transmitted from the user's user/network interface. By way of example, the user fee may be doubled if the user wants to obtain one degree of higher priority for every cell without changing the actual bit rate. The resulting QoS of the connection, therefore, should be improved such that at least some users are willing to pay the additional charge.

EXAMPLE #2

In accordance with this illustrative example, the following assumptions and consideration are given. It is assumed that there are many identical traffic sources which generate traffic independent of the current or previous load conditions in the network. The following traffic parameters are assumed: the link capacity is C=1, which is useful in the examples as a means of normalization; the peak bit rate $MBR_{MAX}$=0.1, which represents 10 percent of the link capacity, C; the ON probability at the burst (or packet) scale=0.2; and the average burst duration=1,000 time slots (i.e., the average packet size=100 cells). In addition, it is assumed that there is an upper ON/OFF layer, and that both the average ON-period and OFF-period of this layer are 100,000 time slots. The real time buffer 93 contains 200 cell locations and the non-real-time buffer 94 contains 5,000 cell locations.

It is noted that the upper ON/OFF layer attempts to model the traffic process of connections, in which the determination of the number of connections is understood in the art to constitute a stochastic, random process. For example, if it is assumed that the total number of customers is represented by the variable x, then the average number of connections is x/2. More particularly, the number of connections is understood to be binomially distributed. As such, 100,000 time slots represent the average holding time of a connection, and, also, the average idle period realizable by the user. As a consequence, a user is transmitting cells only if a connection is active both at the connection layer and the packet layer.

Using Equation [4] above for approximating the time scale parameter, α, we obtain the following time scale parameters for the real-time and non-real-time connections:

$\alpha_{rt}$=0.025

$\alpha_{nrt}$=0.001

In this example, eight different connection types are assumed: four connections are real-time connections and four are non-real-time connections. Also, four different NBR values, which have been normalized with respect the link capacity of C=1, are assumed as: 0.2, 0.1, 0.05 and 0.025. The priorities corresponding to these NBR values, with $MBR_{MAX}$=0.1, are 3, 4, 5 and 6, respectively. It should be noted, however, that not all cells are assigned these exact priorities, and that especially with non-real-time connections, many cells obtain better priority values because of the affects of the averaging measuring principle. The distribution of cells having different priority levels, represented as percentages, is presented below in Table 3:

TABLE 3

| PRIORITY LEVEL | REAL (SIMULATED) PERCENTAGE OF OFFERED CELLS | PERCENTAGE BASED ON PEAK RATES |
|---|---|---|
| 1 | 6.1 | 0 |
| 2 | 7.9 | 0 |
| 3 | 24.3 | 25 |
| 4 | 23.5 | 25 |
| 5 | 21.5 | 25 |
| 6 | 16.8 | 25 |

Figure 19:
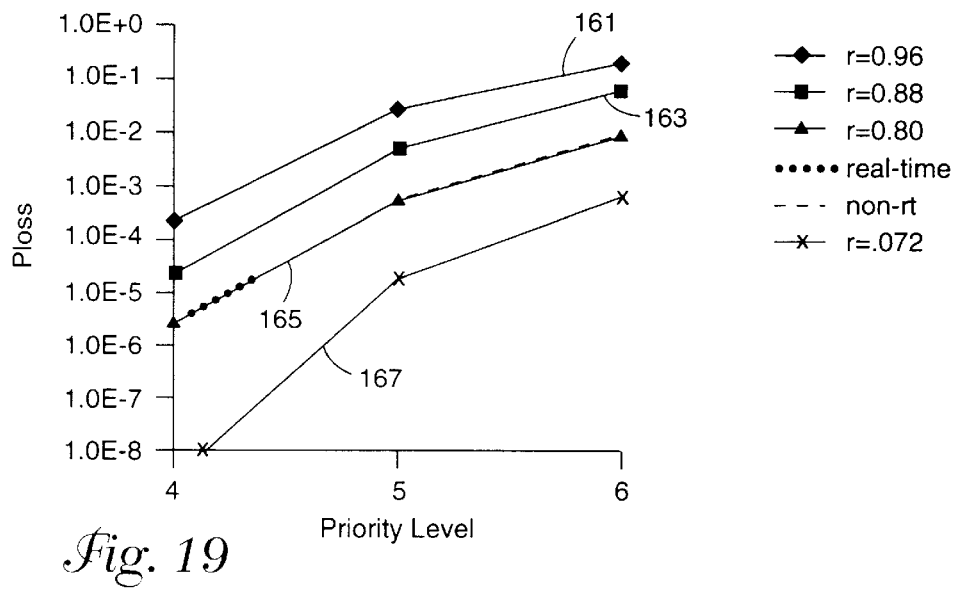
FIGS. 19–20 are graphical depictions of the relationship of average cell loss ratio, $P_{loss}$, as a function of priority level for four specific load levels.

In FIG. 19, there is shown a graph illustrating the relationship of average cell loss ratio, $P_{loss}$, as a function of priority level for four specific load levels, r. In particular, line-167 represents an overall average load level of 0.72 for 9 connections of each connection type (i.e., real-time and non-real-time connection types). Line-165 depicts an average load level of 0.80 for 10 connections of each connection type. Further, line-163 represents an average load level of 0.88 for 11 connections of each connection type, and line-161 represents an average load level of 96 for 12 connections of each connection type. It is noted that, in the case of line-165 indicating a load level of 0.80, the cell loss ratios, $P_{loss}$, for real-time and non-real-time cells are indicated by dotted and broken lines, respectively.

Given, for example, a traffic scenario where the operator wants to offer a cell loss ratio of $10^{-6}$ to cells with priority 4, the total load can be approximately 0.75. It can be assumed that this average cell loss ratio is sufficient for most video applications. Give the same traffic load conditions, priority level 5, which corresponds to $P_{loss} \approx 10^{-4}$ can meet the requirements of many voice applications, while priority 6, which corresponds to $P_{loss} \approx 3 \cdot 10^{-3}$, is suitable for a TCP/IP type of file transfer, provided that there is an adequate packet discarding scheme in is place.

It should be emphasized, however, that the difference in cell loss ratio between adjacent priorities depends strongly on the offered traffic process and, in particular, the inherent control loops of the NBR or SIMA service. When the user perceives an unsatisfactory QoS, for example, the user can, and should, change either the actual bit rate or the nominal bit rate of the connection. In either case, the priority distribution changes as well. Nevertheless, if this phenomenon is temporarily ignored, the basic behavior of priority distribution may be further appreciated by making the following simplifying assumption: If it is assumed that all traffic variations are slow as compared to the measuring period and buffer size, then a well-known, conventional ATM approach to approximating cell loss ratio may be used, with the additional requirement that the eight NBR priority levels are taken into account.

If the loss ratio of cells with priority k is denoted by $P_{loss,k}$, and the average loss ratio of cells with a priority of 0 to k is denoted by $P^*_{loss,k}$, then the following equation, which ignores buffering effect, provides that:

$$P^*_{loss,k} = \frac{\sum_{j:\lambda_j > c} \Pr\{\lambda^*_k = \lambda_j\}(\lambda_j - c)}{\rho^*_k c} \quad [12]$$

$$P_{loss,0} = P^*_{loss,0}$$

$$P_{loss,0} = \frac{\rho^*_k P^*_{loss,k} - \rho^*_{k-1} P^*_{loss,k-1}}{\rho^*_k - \rho^*_{k-1}} \text{ for } k = 1 \ldots 7$$

where $\lambda^*_k$ represents the momentary bit rate level of all cells with a priority of 0 to k, $\rho^*_k$ represents the average offered load produced by these cells, and c represents the link capacity. The probability $Pr\{\lambda_k^* = \lambda_j\}$ can be calculated in a straightforward manner using known convolution techniques.

EXAMPLE #3

For purposes of further illustration, a second example is provided which assumes the same sources described in Example #2, except for the long ON and OFF periods. Because of the long periods reflected in Example #2, the peak rate always determines the cell priority. As the buffers are typically not capable of filtering any traffic variations, the allowed load in Example #3 is much lower than that in the original case of Example #2.

Figure 20:
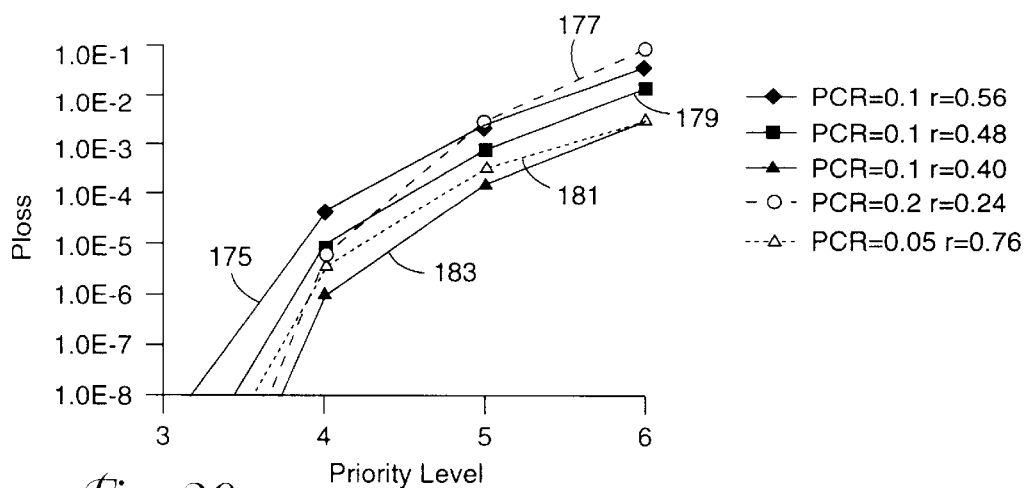

In FIG. 20, there is illustrated in graphical form a relationship between cell loss ratio as a function of priority level for different load levels, r. It is assumed in FIG. 20 that the peak cell rate of each connections depicted by solid lines 183, 179, 175 is 0.1, the peak cell rate of each connection depicted by the broken line 177 is 0.2, and the peak cell rate of each connection depicted by the dotted line 181 is 0.05.

FIG. 20 shows the cell loss probabilities obtained by application of Equation [12] for different priorities, depicted by the three solid lines, line-183, line-179, and line-175. In addition, two slightly different traffic cases are represented by the dotted line-181 and the broken line-177. The effects of changing the traffic variations are reflected in the graph provided in FIG. 20. The actual change in traffic variations is a direct consequence of doubling or halving bit rates and NBR values.

In a network that embraces the NBR/SIMA service concept, an increase of traffic variations has two main effects if the operator keeps the QoS of priority level 4 unchanged. First, the allowed load level is decreased in the same way as in conventional ATM, and second, the difference in cell loss ratio between adjacent priority level decreases. For purposes of providing a rough estimate of QoS based on FIGS. 19 and 20, it may be assumed that if priority level 4 offers a cell loss probability of $10^{-6}$, then the cell loss probability will be approximately $10^{-4}$ to $10^{-3}$ with priority level 5 depending on the overall traffic variations. The cell loss ratio with priority level 3 may be assumed to be less than $10^{-9}$, unless the traffic variations are very pronounced.

Although the above examples provide illustrations of relationships between QoS and priority levels, it may be unfruitful to attempt to exactly determine the allowed load or the cell loss difference between adjacent priority levels until user reactions to different QoS and usage charges are evaluated. In an NBR/SIMA service environment, a schedule of charges based on different QoS levels may be determined, in a certain sense, automatically. For example, if the difference in cell loss ratio between priority levels 4 and 5 is very small, it can be assumed that some of the connections will tend to move from priority level 4 to level 5 because of a lower assessed charge. This change indicates, apparently, that the cell loss ratio of priority level 4 decreases and the cell loss ratio of priority level 5 increases. It can be reasonably assumed that this type of movement continues until the QoS difference corresponds to the average user's expectation of a reasonable charging structure.

Similar concerns are raised with regard to the differences in charging which occur automatically during busy hours in contrast to idle hours. For example, it would appear reasonable to charge higher prices during periods of high load for a certain QoS, and charge lower prices during low load periods. However, it is believed desirable to avoid instigating a charging policy that assesses different fees for a certain NBR during busy and idle periods, which also avoids increasing the complexity of the charging scheme. The naturally occurring "supply and demand" effect may tend to automatically even out the load between busy and idle hours. It is anticipated that, if a user is displeased with the observable difference in QoS during busy and idle periods, the user may be motivated to pay a different rate during such periods.

The cell scheduling or filtering approach described hereinabove may be implemented at a network node for the purpose of scheduling individual cells received at the node. If, however, the cell loss probability is relatively high, the useful throughput vis-à-vis the node could be relatively low, typically requiring corrupted frames or packets to be re-transmitted. In the event that the network load or node buffer occupancy exceeds a pre-defined limit, it may be desirable to implement a scheme in which a network node rejects entire packets or frames of cells, rather than individual cells.

In accordance with this embodiment, if the first cell of a packet or frame is accepted at the node, then all cells of the packet will typically be accepted, unless buffer occupancy reaches a critical level. Provided below, there is presented an approach to processing packets of cells at a network node using the multi-tiered priority level scheme of the NBR service described previously. In general, each network node applies the previously described filtering process for the first cell of each packet, and, if the first cell is discarded, all of the following cells of the packet are likewise discarded. If the first cell of the packet is accepted, then a priority gain/reduction routine is implemented which typically results in increasing the priority of all other cells belonging to that packet. As previously mentioned, the gain of even one priority level is believed to be sufficient to guarantee that there will be only vary few partially transmitted packets. It is noted, however, that the priority gain, represented as the variable G, granted to cells of a packet should not be so large as to disrupt the normal operation of the NBR service.

Figure 14:
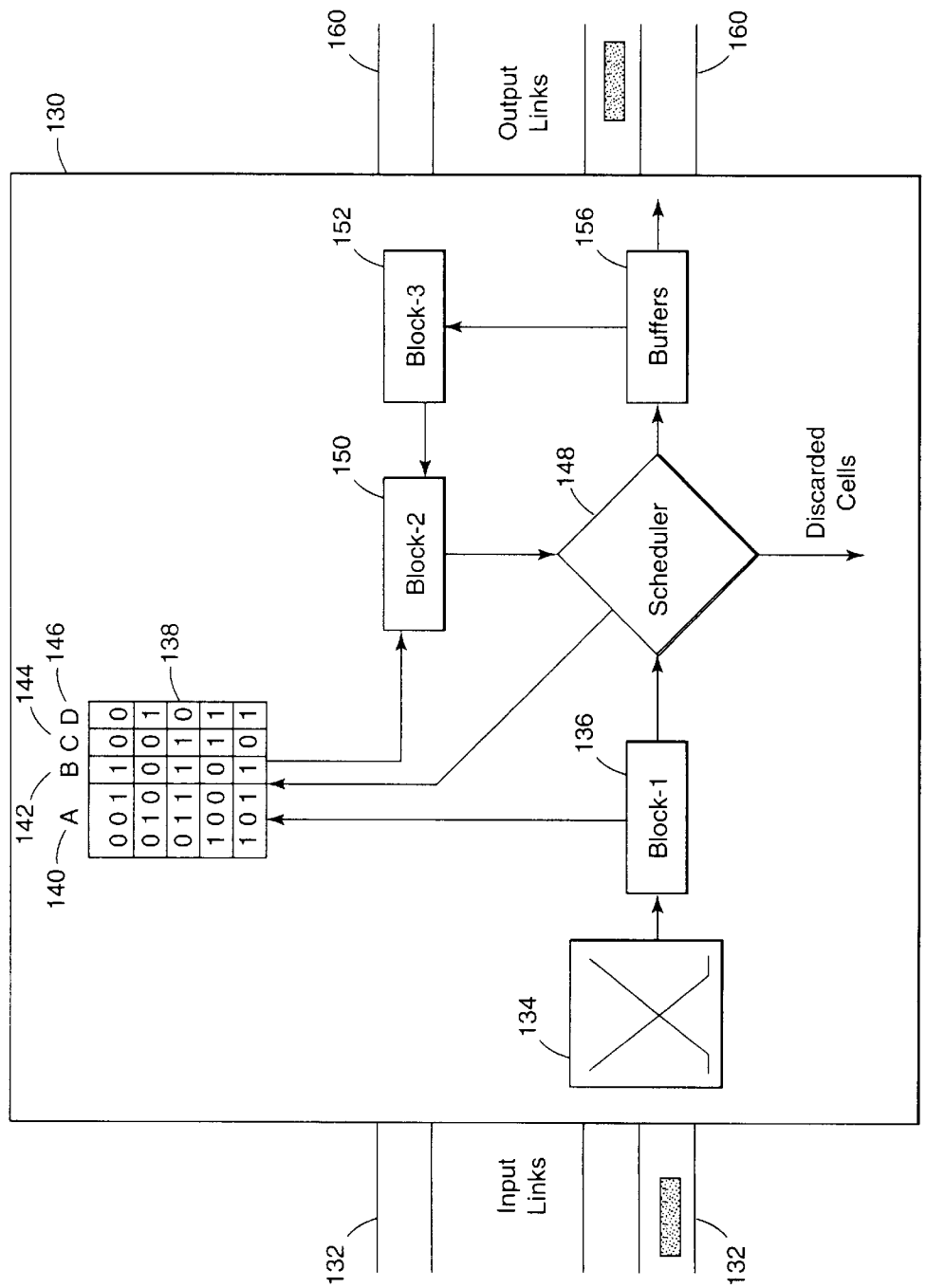
FIG. 14 is a block diagram illustrating an embodiment of a filtering unit provided at a network node that processes packets of cells.
Figure 15:
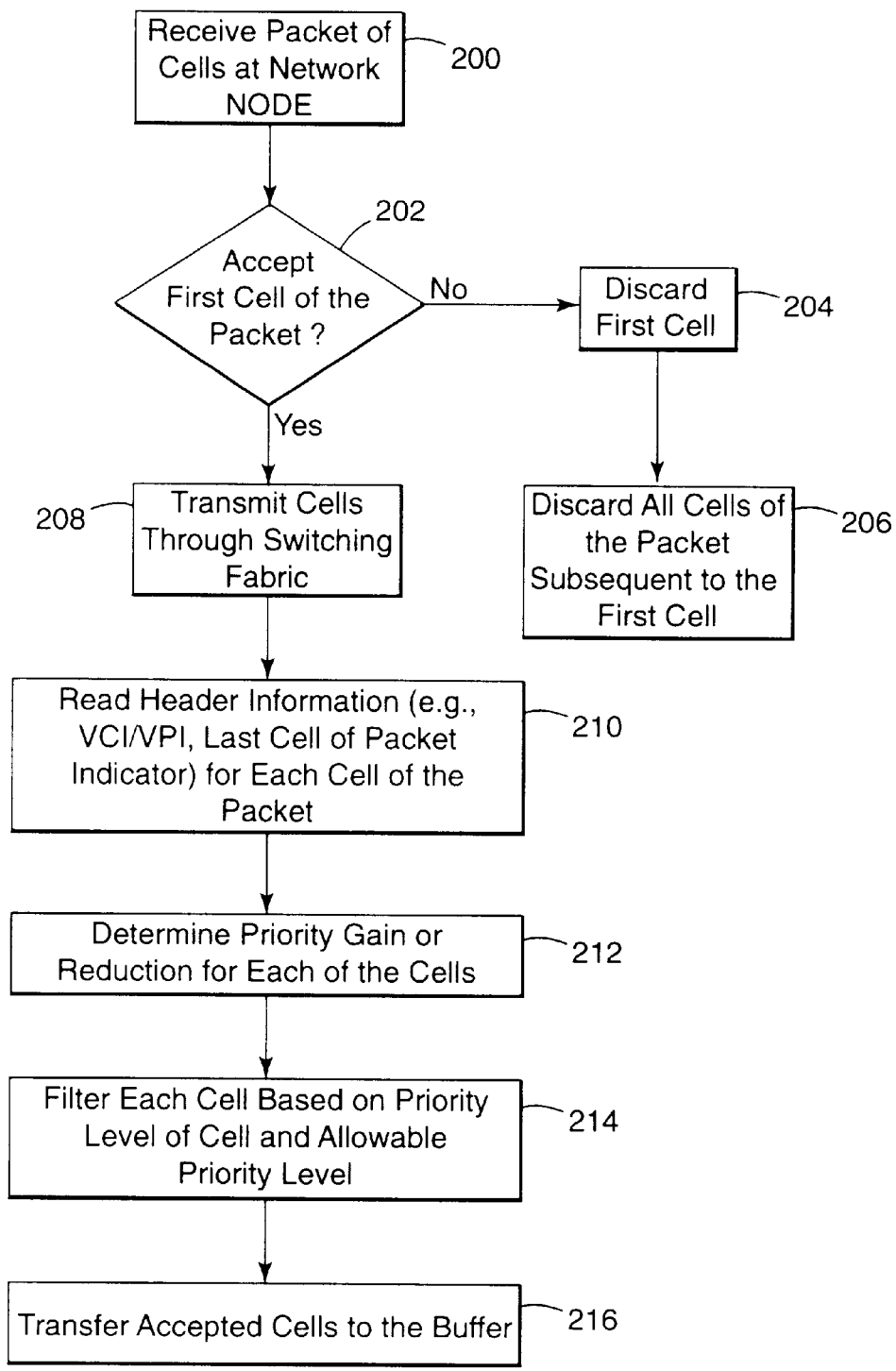
FIG. 15 is a flow diagram illustrating various steps involving the filtering of packets of cells at a network node.

Turning now to FIGS. 14 and 15, there is illustrated in block diagram form and flow diagram form, respectively, an embodiment of a packet discarding scheme implemented within a network node 130. It is understood that the term packet refers to any association of a plurality of cells. Initially, a packet of cells is received 200 at an input 132 of a network node 130. If the first cell of a packet is not accepted 202, then the first cell is discarded 204 by the scheduler 148, and all other cells of the packet subsequent to the first cell are similarly discarded 206. If the first cell of a packet is accepted 202, then the first cell as well as subsequent cells of the packet are transmitted 208 through the switching fabric 134. At Block-1 136, cell header information for each cell, such as virtual channel/virtual path identifier (VCI/VPI) information, as well as information indicating whether the cell is the last cell of a packet, is read 210.

Processing Block-1 136 initiates a priority gain/reduction routine to determine 212 the priority gain or reduction for each cell of the packet. Processing Block-2 150 calculates an adjusted allowable priority level, $PL_a^*$, based on the status of the buffers 156 (i.e., $PL_a$ computed by Block-3 152) and the priority gain value, G, determined by Block-1 136. Each cell is then processed 214 by the scheduler 148 to determine whether the cell should be transferred to the buffers 156 or discarded based on the priority level of the cell, $PL_c$, and the adjusted allowable priority level, $PL_a^*$, computed by Block-2 150. If, based on this evaluation, the scheduler 148 determines that the cell meets the acceptance criteria, the cell is transferred 216 to the buffers 156. It is noted that the buffers 156 typically include a real-time buffer and a non-real-time buffer similar to those previously described.

Figure 16:
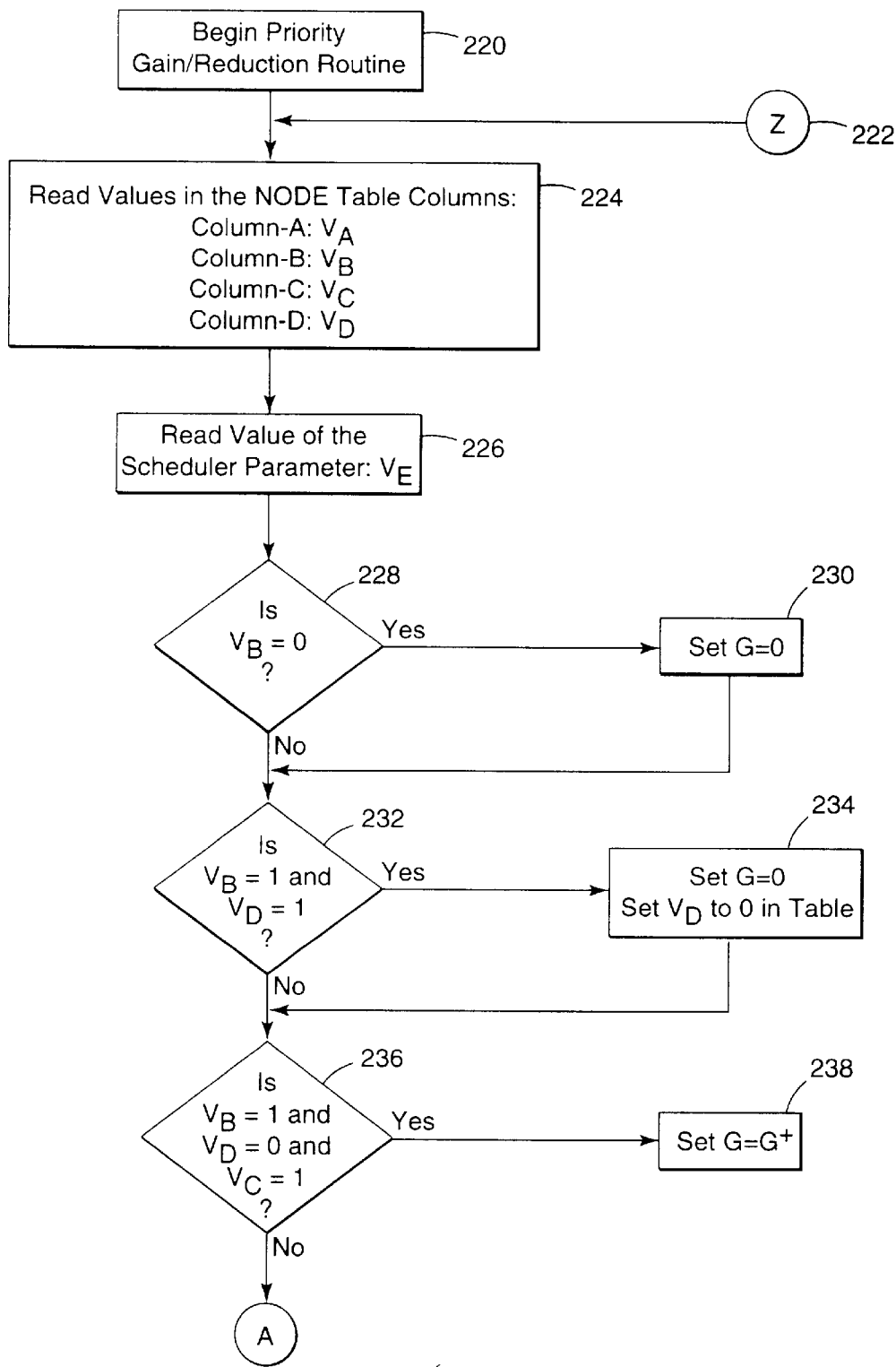
FIGS. 16–18 illustrate in flow diagram form various steps of a procedure for processing packets of cells at a network node or switch.
Figure 17:
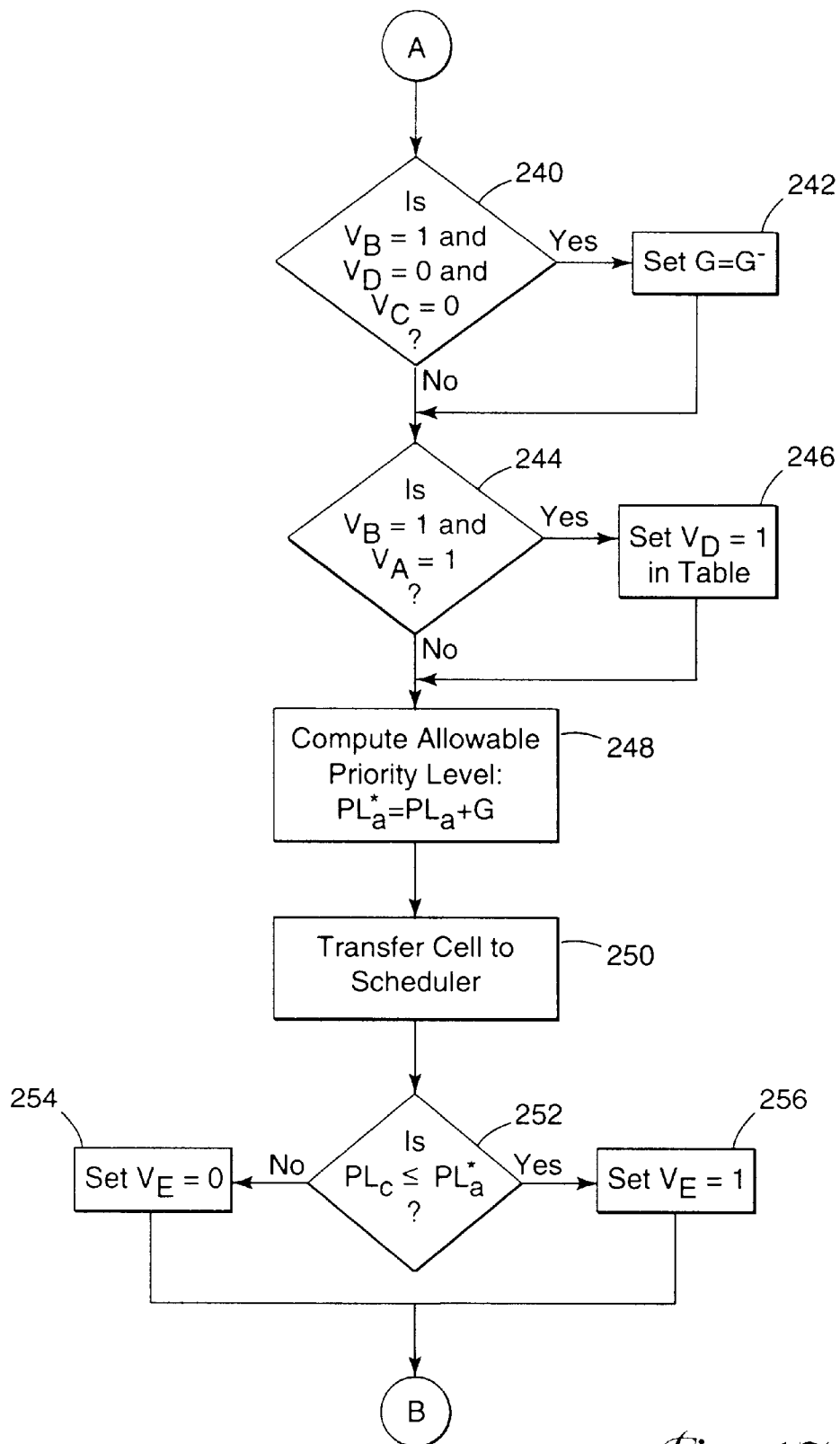
Figure 18:
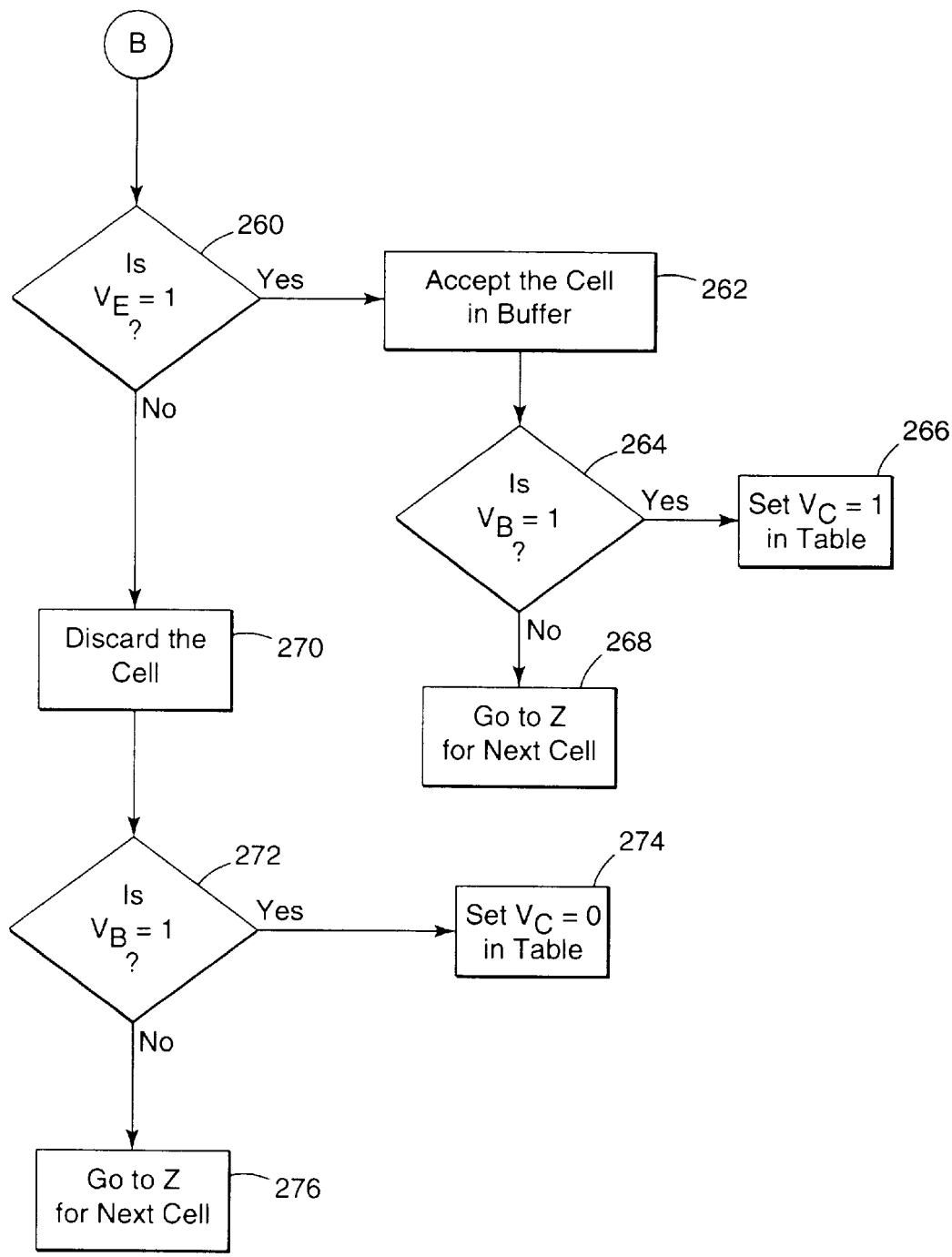

With regard to FIGS. 16–18, there is illustrated in flow diagram form a methodology by which a network node modifies the priority level of cells subsequent to the acceptance of a first cell of a packet received at the network node. As was previously discussed with regard to FIG. 14, processing Block-1 136 reads header information of each cell, such as VCI/VPI and last cell information. Block-1 136 cooperates with a node table 138 which is used by the node 130 to determine the output link and a new VCI/VPI value for each incoming cell received at the node 130. A standard node table, which typically includes information represented in Column A 140, may be expanded to include three additional Boolean fields which are utilized to effectuate the packet discarding methodology in accordance with one embodiment of the invention.

Column A 140 in the node table 130 contains the VPI/VCI information. The width of Column A 140, which is depicted in FIG. 14 as being 3 bits wide for purposes of illustration only, is sufficient in size to accommodate appropriately identified VPI and VCI fields, such as up to 28 bits wide for example. The number of row entries in the node table 138 may be as many as needed to identify the different VPI/VCI combinations supported by the node. Columns B 142, C 144, and D 146 are each one bit wide.

Column B 142 is used to indicate whether the packet discard procedure is applied to a particular connection. The variable $V_B$ is true (i.e., $V_B$32 1) if and only if the packet discard principle is applied to a particular connection. Column C 144 is used to indicate whether a first cell of a packet has been accepted, whereby $V_C$ is true (i.e., $V_C$=1) if and only if the current cell is the first cell of a packet and this cell has been accepted by the node 130. The Variable $V_D$, represented in Column D 146, is true if and only if the previous cell has been determined to be a last cell in a packet, thus indicating that the current cell is the first cell of the next packet. In addition, the scheduler 148 uses a Boolean parameter, $V_E$, which is true (i.e., $V_E$=1) if and only if the cell is accepted by the scheduler 148.

In general, the priority gain scheme illustrated in FIG. 14 determines the priority gain, G, for a particular cell. If $V_B$=0, then G is always 0, thus indicating that when the packet discard principle is not applied, the priority gain, G, is zero. If $V_D$=1, then G is always zero, thus indicating that if the previous cell is identified as being the last cell of a packet, the particular cell being analyzed is the first cell of a packet and, as such, the priority gain is zero. If $V_B$=1, and $V_D$=0, and $V_C$=0, then G=$G^+$. That is, if the packet discard principle is applied, and the particular cell being analyzed is not the first cell of a packet, and all of the previous cells of the packet have been accepted, then the priority gain is $G^+$. If $V_B$=1, and $V_D$=0, and $V_C$=1, then G=$G^+$. That is, if the packet discard principle is applied, and the particular cell being analyzed is not the first cell of a packet, and any of the previous cells of the packet have been rejected, then the priority gain is $G^-$. In practice, this means that the cell will generally be discarded.

Further in general, if $V_D$=1, then after setting G=0, $V_D$ is set to 0. That is, if the previous cell was identified as being the last cell of a packet, then the current cell is the first cell of the next packet. If the current cell is marked as the last cell of a packet, then $V_D$ is set to 1. If the current cell is the first cell of the packet, and this cell has been accepted, then $V_C$ is set to 1. If the particular cell being evaluated is rejected, and the packet discarding principle is applied (i.e., $V_B$=1), then Vc is set to 0.

At the initiation 220 of the priority gain/reduction routine by the arrival of a cell at Block-1 136, Block-1 136 scans Column A 140 of the node table 138 in order to locate the proper row corresponding to the VPI/VCI value set in the cell header. Block-1 136 then reads the values of the variables $V_A$, $V_B$, $V_C$, $V_D$ from corresponding Columns A 140, B 142, C 144, and D 146 of the node table 138, as step 224. Block-1 136 also reads the value of the scheduler parameter, $V_E$, at step 226. It is noted that the scheduler parameter, $V_E$, may be stored in the node table 138 or elsewhere within the node memory scheme.

Block-1 136, at step 228, determines whether $V_B$0 and, if so, the priority gain variable, G, is set to zero in Block-2, at step 150. If $V_B$=0, this state indicates that the packet discard principle is not applied to the connection and as such, a cell filtering procedure is executed, as is indicated at step 252 of FIG. 17, with the addition of a number of subsequent processing steps shown if FIG. 18. If, however, $V_B$=1 and $V_D$=1, as is tested at step 232, the priority gain variable, G, is set to zero in Block-2 150 and variable $V_D$ is set to zero in the node table 138, at step 234. If, at step 236, $V_B$=1 and $V_D$=0 and $V_C$=1, then the priority gain variable, G, is set to G=$G^+$, at step 238. At step 240, if $V_B$=1 and $V_D$=0 and $V_C$=0, then the priority gain variable, G, is set to G=$G^-$, at step 242.

The priority gain parameter, G, may be indicated as a priority gain represented by the variable $G^+$ or as a priority reduction represented by the variable $G^-$. The value of $G^+$ is typically 1 or 2 when the first cell of a packet has been accepted. The value of $G^-$ may be as great as −8, which effectively means that all cells belonging to the same packet will be discarded after the first cell is discarded. If $V_B$=1 and $V_A$=1, as is tested at step 244, then variable $V_D$ is set to 1 in the node table 138, at step 246.

At step 248, Block-2 150 computes the adjusted allowable priority level, $PL_a^*$, using the following formula:

$$PL_a^* = PL_a + G \qquad [13]$$

where, $PL_a^*$ represents the adjusted allowable priority level, $PL_a$ represents the allowable priority level which is computed in a manner previously described, and G represents the priority gain value stored in Block-2 150. It is noted that Block-3 152 computes the allowable priority level, $PL_a$ using the previously described method.

After Block-2 150 computes the adjusted allowable priority level, $PL_a^*$, the cell is transferred to the scheduler 148, at step 250. The scheduler 148 then determines, at step 252, whether $PL_C \leq PL_a^*$. If the cell priority level, $PL_c$, is less than or equal to the adjusted allowable priority level, $PL_a^*$, the variable $V_E$ is set to 1, at step 256, otherwise $V_E$ is set to 0, at step 254.

Continuing further, and with reference to FIG. 18, if $V_E$=1, as is tested at step 260, the cell is accepted by the scheduler 148 and transferred to the buffers 156, at step 262. If the cell is transferred to the buffers 156, the scheduler 148 determines whether $V_B$=1, at step 264, and if such is true, the scheduler 148 sets the variable $V_C$=1 in the node table 138, at step 266. If the scheduler 148 determines that $V_B$=0, then, at step 268, processing is transferred to location Z at step 222 shown in FIG. 16. If, at step 260, the scheduler 148 determines that $V_E$=0, then the scheduler 148 discards the cell, at step 270. The scheduler 148 then determines whether $V_B$=1, at step 272, and if such is true, the scheduler 148 sets $V_C$=0 in the node table 138. Otherwise, as indicated at step 276, processing is transferred to location Z at step 222 shown in FIG. 16.

It is to be understood that the packet discarding methodology illustrated in FIGS. 14–18 is provided for illustration only and is not to be construed as limiting the manner in which a network node or switch may process packets or frames of cells received from an NBR service connection. Those skilled in the art will understand that other implementations for effectuating packet discarding at a network node come within the scope and spirit of the present invention.

Another advantage offered to providers of an NBR network service concerns a significant reduction in the difficulties associated with dimensioning a network and properly allocating bandwidth amongst a multiplicity of network connections. In accordance with the principles of the NBR service paradigm disclosed herein, network dimensioning is based on an average quality of service offered to nominal connections. In practice, a network operator measures the cell loss ratio of cells having a priority level of 4 (i.e., cells in which the MBR is substantially equal to the NBR). If the measured CLR value is determined to be greater than a reasonable threshold, such as $10^{-6}$ for example, the network operator should consider increasing the capacity of the network after identifying the location of a bottleneck. It is noted that this capacity increase may be accomplished in a simple and straightforward manner, since this determination does not require concern of the switching structure, and the capacity division between traditional service classes or virtual paths, for example.

It is noted that higher priority levels (e.g., PL=5, 6, and 7) are primarily used by the network operator to allocate remaining network capacity amongst highly variable connections. It is further noted that the cell loss ratio for cells having a priority level of 7 could be temporarily very high, even upwards to 100%, while the cell loss ratio for cells having a priority level of less than 3 should be negligible, such as on the order of less than $10^{-9}$.

In accordance with another embodiment of the present invention, a SIMA service model provides for the accommodation of both NBR and traditional ATM service connections. It is appreciated that traditional ATM services which offer guaranteed connections may be desirable for certain applications. It is anticipated, however, that the quality of service offered by the NBR service of the present invention will meet or exceed a user's expectations for virtually all real-time and non-real-time applications.

A SIMA service which provides for both NBR and traditional ATM services requires that the network operator dedicate a UPC device for each conventional ATM connection, or possibly for each virtual path. All of the cells transmitted using traditional ATM service connections are designated with the highest priority of PL=0 and with a real-time (rt) service class designation. In accordance with this approach, the zero priority level is reserved for those connections that use an ordinary ATM service with guaranteed bandwidth and quality of service. Accordingly, the priority determination Equation [5] above is modified so as to produce cell priority levels ranging between PL=1 and PL=7, such that $\lfloor x \rfloor$ represents the integer part of x, if 1<x<7. It is noted that if the network operator wants to mark excessive cells as CLP=1 cells, those cells may be marked with a lower priority, such as PL=6, for example.

As was discussed previously, a point of possible incompatibility with traditional ATM technology involves the necessity of three bits for each ATM cell for the determination of cell priority, or two bits if the current cell loss priority, CLP, bit in the cell header is used. In addition, one bit is needed to s distinguish between real-time and non-real-time connections. The rt/nrt service bit may be, but is not required to be, included in every cell. As mentioned previously, it may be possible to use the current Generic Flow Control (GFC) field in the cell header which constitutes four bits. In this case, all three priority bits and the rt/nrt service bit can be situated in the cell header. If this is not possible, the required bits (2, 3 or 4 depending on the use of CLP bit and the status of rt/nrt bit) may be situated outside the current cell header.

Including the rt/nrt service bit in each cell header may further simplify the implementation of cell scheduling and buffering (CSB) blocks and core network nodes, as the blocks do not need to keep record of every connection. If the location of the rt/nrt service bit is known and stable, then the CSB blocks can operate autonomously or independent of other parts of the node. In addition, this approach may alleviate some problems with connectionless traffic, even though this type of traffic can be assumed to use non-real-time class services.

In addition, there should be implemented a simple connection admission control (CAC) method, such as one based on peak rate allocation. Peak rate allocation should be a satisfactory basis for a CAC method because, in practice, the fee for use of a conventional ATM connection with a priority level of zero will essentially be higher than the charge of a SIMA connection with the same bit rate and a priority level of 3 or 4. Also, the SIMA scheme disclosed herein very efficiently exploits the capacity between the allocated and actual used bit rates of VBR connections, as there is no real capacity allocation for different connections or services. A possible interworking scheme 10 for transferring ATM services over a SIMA network is presented in Table 4 below:

TABLE 4

| ATM SERVICE | LP | IMA CLASS rt/nrt | PRIORITY LEVEL | CONNECTION ACCEPTANCE IN SIMA NETWORK |
|---|---|---|---|---|
| CBR | 0 | rt | 0 | Peak Rate Allocation |
|  | 1 | rt | 5 or 6 | — |
| rt-VBR | 0 | rt | 0 | Peak Rate Allocation |
|  | 1 | rt | 5 or 6 | — |
| rt-VBR | 0 | nrt | 0 | Peak Rate Allocation |
|  | 1 | nrt | 5 or 6 | — |
| ABR | 0 | nrt | ? | ? |
|  | 1 | nrt | ? | ? |
| UBR | 0 | nrt | 5 or 6 | Not Applicable |
|  | 1 | nrt | 6 or 7 | Not Applicable |

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A method of managing cells at a node of a network received over a connection established between a network access node and the network node, comprising:

determining an occupancy state of a memory provided at the network node, the memory arranged to store real-time cells and non-real-time cells;

establishing an allowable priority level for the network node based on the occupancy state of the memory;

detecting a priority level identifier of a cell received at the network node, the priority level identifier of the cell indicating a probability of cell acceptance at the network node; and transferring the cell into the memory at the network node in response to the priority level identifier of the cell being equal to or less than the allowable priority level established for the network node;

wherein:

determining the occupancy state of the memory further comprises:

determining a number of cells occupying a real-time portion of the memory and a number of cells occupying a non-real-time portion of the memory;

determining a number of memory locations defining the real-time memory portion and a number of memory locations defining the non-real-time memory portion;

computing an occupancy level of the real-time memory portion using the number of cells occupying the real-time memory portion and the number of memory locations defining the real-time memory portion; and computing an occupancy level of the non-real-time memory portion using the number of cells occupying the non-real-time memory portion and the number of memory locations defining the non-real-time memory portion; and establishing the allowable priority level for the network node further comprises establishing the allowable priority level using the occupancy levels of the real-time and non-real-time memory portions.

2. The method of claim 1, further comprising suspending transferring of non-real-time cells out of the memory until all real-time cells have been transferred out of the memory.

3. The method of claim 1, wherein the cell received at the network node constitutes a first cell of a packet or frame, and the method further comprises discarding the first cell and other cells of the packet or frame if a priority level indicator of the first cell is greater than the allowable priority level.

4. The method of claim 1, wherein:

the cell received at the network node constitutes a first cell of a packet or frame; and in response to a priority level identifier of the first cell being equal to or less than the allowable priority level, transferring the first cell and other cells of the packet or frame to the memory.

5. The method of claim 1, wherein:

the cell received at the network node constitutes a first cell of a packet or frame; and in response to a priority level identifier of the first cell being equal to or less than the allowable priority level, adjusting the priority level identifier of other cells of the packet or frame.

6. A method of managing cells at a node of a network received over a connection established between a network access node and the network node, comprising:

determining an occupancy state of a real-time buffer and a non-real-time buffer provided at the network node;

establishing a cell acceptance threshold for the network node based on the occupancy states of the real-time and non-real-time buffers;

detecting whether a cell received at the network node is a real-time cell or a non-real-time cell;

comparing a priority level identifier of the cell received at the network node with the cell acceptance threshold, the priority level identifier of the cell indicating a probability of cell acceptance at the network node; and in response to the priority level identifier of the cell being equal to or less than the cell acceptance threshold, transferring the cell to the real-time buffer if the cell is a real-time cell or transferring the cell to the non-real-time buffer if the cell is a non-real-time cell;

wherein:

determining the occupancy state of the real-time and non-real-time buffers further comprises:

determining a number of cells occupying the real-time buffer and a number of cells occupying the non-real-time buffer;

determining a number of buffer locations defining the real-time-buffer and a number of buffer locations defining the non-real-time buffer;

computing an occupancy level of the real-time buffer using the number of cells occupying the real-time buffer and the number of buffer locations defining the real-time-buffer; and computing an occupancy level of the non-real-time buffer using the number of cells occupying the non-real-time buffer and the number of buffer locations defining the non-real-time-buffer; and establishing the cell acceptance threshold for the network node further comprises establishing the cell acceptance threshold using the occupancy levels of the real-time and non-real-time buffers, respectively.

7. The method of claim 6, further comprising suspending transferring of non-real-time cells out of the non-real-time buffer until all real-time cells have been transferred out of the real-time buffer.

8. The method of claim 6, wherein the cell received at the network node constitutes a first cell of a packet or frame, and the method further comprises discarding the first cell and other cells of the packet or frame if a priority level indicator of the first cell is greater than the cell acceptance threshold.

9. The method of claim 6, wherein:

the cell received at the network node constitutes a first cell of a packet or frame; and in response to a priority level identifier of the first cell being equal to or less than the cell acceptance threshold, transferring the first cell and other cells of the packet or frame to the real-time buffer if the first cell is a real-time cell or transferring the first cell and other cells of the packet or frame to the non-real-time buffer if the first cell is a non-real-time cell.

10. The method of claim 6, wherein:

the cell received at the network node constitutes a first cell of a packet or frame; and in response to a priority level identifier of the first cell being equal to or less than the cell acceptance threshold, adjusting the priority level identifier of other cells of the packet or frame.

11. An apparatus provided at a node of a network for managing cells received over a network connection, comprising:

a memory arranged for storing real-time cells and non-real-time cells;

a memory manager that determines an occupancy state of the memory and computes a cell acceptance threshold for the network node based on the occupancy state of the memory;

a detector that detects whether a cell received from the network connection is a real-time cell or a non-real-time cell, and detects a priority level identifier of the cell, the priority level identifier of the cell indicating a probability of cell acceptance at the network node; and a filter that discards the cell received from the network connection if a priority level identifier of the cell is greater than the cell acceptance threshold, and, if the priority level identifier of the cell is equal to or less than the cell acceptance threshold, cooperates with the memory manager to transfer the cell to the memory;

wherein the memory manager determines a number of cells occupying a real-time portion of the memory and a number of cells occupying a non-real-time portion of the memory, determines a number of memory locations defining the real-time memory portion and a number of memory locations defining the non-real-time memory portion, computes an occupancy level of the real-time memory portion using the number of cells occupying the real-time memory portion and the number of memory locations defining the real-time memory portion and computes an occupancy level of the non-real-time memory portion using the number of cells occupying the non-real-time memory portion and the number of memory locations defining the non-real-time memory portion.

12. The apparatus of claim 11, wherein the memory manager cooperates with the filter to transfer real-time cells to a first portion of the memory designated for storing real-time cells and non-real-time cells to a second portion of the memory designated for storing non-real-time cells.

* * * * *